(12) United States Patent
Inoue et al.

(10) Patent No.: US 7,176,637 B2
(45) Date of Patent: Feb. 13, 2007

(54) RARE GAS FLUORESCENT LAMP APPARATUS

(75) Inventors: Masaki Inoue, Hyogo (JP); Hiroyuki Kushida, Hyogo (JP); Takahiro Hiraoka, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/232,945

(22) Filed: Sep. 23, 2005

(65) Prior Publication Data

US 2007/0007906 A1    Jan. 11, 2007

(30) Foreign Application Priority Data

Sep. 24, 2004    (JP) ............................... 2004-276922

(51) Int. Cl.
*G05F 1/00*    (2006.01)

(52) U.S. Cl. ........................................ 315/291; 315/307

(58) Field of Classification Search ................ 315/219, 315/291, 224, 209 R, 307–308, 312
See application file for complete search history.

(56) References Cited

U.S. PATENT DOCUMENTS

| | | | |
|---|---|---|---|
| 6,288,501 B1 * | 9/2001 | Nakamura et al. ........... | 315/307 |
| 6,437,519 B1 * | 8/2002 | Ito ............................... | 315/291 |
| 6,495,971 B1 * | 12/2002 | Greenwood et al. ........ | 315/291 |
| 6,605,906 B2 * | 8/2003 | Okamoto et al. ........... | 315/291 |
| 7,002,305 B2 * | 2/2006 | Kambara et al. ........... | 315/291 |
| 2002/0167284 A1 * | 11/2002 | Okamoto et al. ........... | 315/291 |
| 2005/0012473 A1 * | 1/2005 | Samejima et al. .......... | 315/291 |

FOREIGN PATENT DOCUMENTS

JP         05-335091 A      12/1993

* cited by examiner

*Primary Examiner*—Tuyet Vo
*Assistant Examiner*—Tung Le
(74) *Attorney, Agent, or Firm*—Rader, Fishman & Grauer PLLC

(57) ABSTRACT

When a control unit is operated by a lighting control signal, when a reference voltage source unit outputs the reference voltage, voltage inputted into an error amplifier from a time constant circuit increases gradually with passage of time so as to reach the reference voltage. The error amplifier compares the voltage, which gradually increases with a power to be impressed to a lamp. An inverter circuit controls power to be supplied to the lamp according to the error signal. Thereby, the lamp power is controlled at time immediately after the lamp lighting signal is inputted. In addition, by providing a thermo-sensitive element for detecting circumference environmental temperature, it is possible to reduce influence to the light intensity due to the circumference environmental temperature. Further, the time constant circuit and the thermo-sensitive element may be provided in the detecting circuit.

4 Claims, 20 Drawing Sheets

Light Emitting Direction

RARE GAS FLUORESCENT LAMP APPARATUS

TECHNICAL FIELD OF THE INVENTION

The present invention relates to a rare gas fluorescent lamp apparatus of an information apparatus such as a facsimile, a copying machine, image reader etc., which is used for irradiation of a document etc.

DESCRIPTION OF RELATED ART

As a light source for scanning such a document, a cold fluorescent lamp or a rare gas fluorescent lamp is known.

The cold cathode lamp comprises an outer enclosure and inner electrodes, and is used as, for example, a light source for a crystal liquid back light etc., in which mercury is enclosed. In the cold cathode lamp, when electrons move to and have collision with the electrodes by impressing high frequency wave voltage between the two inner electrodes, secondary electrons are released thereby initiating electric discharge. By the electric discharge, electrons pulled by the anode collide with mercury molecules in an arc tube so that mercury is excited, and fluorescent material coated on an inner surface of the outer enclosure is excited by 253.7 nm of ultra-violet radiation, which is mercury excitation spectrum, thereby emitting visible light therefrom. Since vapor pressure of the mercury enclosed in the arc tube, depends on ambient air temperature around the lamp, there are problems of initiation failure and reduction of light intensity at low temperature.

In order to solve such problems, the technology in which light intensity is adjusted, by using a thermo-sensitive device has been proposed. Refer to Japanese Laid Open Patent No. 5-335091 for the above technology.

In the invention disclosed in the patent, the thermo-sensitive device whose resistance changes depending on the circumference environmental temperature, is disposed, so as to light a plane fluorescent arc tube lamp by adjusting output pulse width according to the resistance of the thermo-sensitive device. According to the invention disclosed in the patent, a change of the light intensity to circumference environmental temperature can be reduced.

On the other hand, in the rare gas fluorescent lamp which uses the excimer light generated by electric discharge, when high-frequency high-voltage is impressed thereto, voltage is generated by dielectric polarization in an outer enclosure which is made of dielectric, and when the voltage reaches the breakdown voltage of internal gas which is in contact with the outer enclosure, electric discharge begins.

The electric discharge is very small in which a diameter thereof is approximately 0.1 mm, and when the conditions of discharge breakdown are satisfied on the dielectric surface between electrodes, a number of small electric discharges occur.

When the generated electric discharges disappear automatically in a short time, accelerated electrons have energy distribution that have much at a level that slightly exceeds the minimum excitation energy of Xe (xenon). Consequently, each of the number of electric discharges can realize comparatively high efficiency. Since the generated excitation seeds and ionized atoms contribute to generation of excited xenon molecule in some processes, 172 nm of excimer luminescence becomes dominant over the resonance line, which is 147 nm.

The fluorescent material coated on the inside of the outer enclosure is excited by the 147 nm and 172 nm of ultraviolet-rays radiation so as to emit visible light. In the rare-gas fluorescence lamp, since mercury is not enclosed, the light intensity does not depend on surrounding environmental temperature, as compared with a cold cathode lamp, which uses excitation of mercury. In the case of the rare-gas fluorescence lamp, what depends on change of circumference environmental temperature is the temperature characteristic (generation efficiency of an excimer) of the rare gas whose main component is xenon, the temperature characteristic of a fluorescent material, and the property of a power supply apparatus.

FIG. 17 is a graph showing change of light intensity to circumference environmental temperature change of a rare-gas fluorescence lamp and a mercury lamp. A horizontal axis of the graph shows temperature (° C.) and, a vertical axis thereof shows the relative illuminance (relative light intensity) at time lighting is stable, wherein light intensity at 25° C. is set to 100. The lighting is stable when the light intensity approximately does not change after 3 to 5 minutes passes. As shown in this figure, light intensity change to circumference environmental temperature change of a rare gas fluorescence lamp is less than that in case of the mercury lamp.

FIGS. 18A and 18B show a configuration example of a rare-gas fluorescence lamp.

The figures show an external electrode type rare-gas fluorescence lamp in which a pair of electrodes is disposed facing each other on an outer surface of the outer enclosure.

FIG. 18A is a schematic diagram showing the structure of the rare-gas fluorescence lamp, and FIG. 18B shows a cross-sectional view thereof taken in a direction perpendicular to the arc tube axial direction of the rare-gas fluorescence lamp. In these figures, a fluorescent material layer 3 is formed inside the outer enclosure 1 which is made of dielectric, a pair of external electrodes 2a and 2b are arranged on the outer surface of the outer enclosure 1, wherein both ends of the outer enclosure 1 are sealed and a predetermined amount of rare gas is enclosed therein. An aperture 4 for extracting light is formed by removing part of the fluorescent material layer 3 on the inner surface of the outer enclosure 1. A power supply apparatus 20 supplies electric power to the external electrodes 2a and 2b.

An outer diameter of the outer enclosure 1 is, for example, $\phi$9.8 mm, the length thereof is, for example, 360 mm, and the outer enclosure 1 is made of, for example, barium glass which is transparent dielectric. The pair of external electrodes 2a and 2b provided on the outer surface of the outer enclosure 1 is formed by attaching a metal tape or printing silver paste by screen printing.

In addition, the pair of electrodes may be arranged on the inner surface and the outer surface of the outer enclosure 1 along a direction of the tube axis of the outer enclosure 1, so to face each other.

The rare gas enclosed in the outer enclosure consists of, for example, 70% of Ne (neon) and 30% of Xe (xenon), wherein the full enclosure pressure of the rare gas is 5–100 kPa.

FIG. 19 shows a block diagram of a conventional rare-gas fluorescence lamp lighting apparatus.

The rare-gas fluorescence lamp 10 is connected to an output terminal of an inverter circuit 27 to which electric power is supplied from a power supply 26, and a control unit 21 is connected to the inverter circuit 27. The control unit 21 comprises an error amplifier 22, a detecting unit 23, a reference voltage source unit 24, and an inverter circuit drive unit 25 equipped with an oscillator that outputs a drive signal for the inverter circuit 27.

The detecting unit 23 is a circuit, which detects the electric power supplied to the lamp 10 based on electrical signals, such as voltage or current. The reference voltage source unit 24, which generates reference voltage is connected to the error amplifier 22.

First, when the control unit 21 is operated by a lighting control signal, the reference voltage source unit 24 outputs the reference voltage.

The error amplifier 22 compares an output of the detecting unit 23 with the above-mentioned reference voltage, so as to generate and output an error signal to the inverter circuit drive unit 25.

The inverter circuit 27 is driven by the inverter circuit drive unit 25, and controls electric power supplied to the lamp 10 according to the output of the above-mentioned error amplifier 22, so that the electric power becomes a value corresponding to the reference voltage, whereby the electric power supplied to the lamp 10 is controlled so as to be stabilized.

SUMMARY OF THE INVENTION

As shown in FIG. 19, if the electric power supplied to the lamp 10 is detected and negative feedback control thereto is carried out, the electric power can be stably controlled. However, when the electric power is stabilized and supplied to the lamp 10, the luminescence property of the lamp 10, that is, the luminous efficiency of the fluorescent material falls due to lamp's own heat generation etc., so that the light intensity of the lamp 10 decreases gradually. That is, although the electric power can be uniformly controlled by the unit for stabilizing the electric power in a conventional power supply apparatus for lighting a discharge lamp, the uniform light intensity cannot be maintained, from immediately after initiation of a lighting operation.

Unlike the above-mentioned cold cathode lamp the light intensity of the rare-gas fluorescence lamp does not depend on surrounding environmental temperature. However, when such a rare gas fluorescence lamp is used as a light source for reading a document, it is required that there is little change of light intensity from immediately after initiation of a lighting operation. The quality of a scanned image is directly influenced by the change of the light intensity.

The reason that the change of light intensity is required to be little in order to maintain the quality of the scanned image will be explained below.

In a black-and-white (monochrome) document reader, a document is sequentially scanned by a photoelectric converter such as a CCD, so that a time factor, that is, the light intensity and position information of the document is calculated, thereby scanning the document. If the light intensity changes at time of initiation of lighting, in a copying machine or a scanner which is the above-mentioned reading system, the light intensity to the position information (in the scanning direction) changes, and even when the document having the same density in the scanning direction is scanned, the light intensity changes in the scanning direction. Thus, the scanned portions in the scanning direction are recognized to have different density even though they have the same density, so that density thereof becomes uneven in the scanning direction whereby the quality of the image is deteriorated.

In case of color document scanning, if there is change of light intensity, the chromaticity is changed with passage of lighting time and color unevenness occurs.

The reason that white light is needed in order to scan a color document will be explained below.

The white light can be obtained by suitably mixing three wavelength lights from three fluorescent materials, that is, red light emitting fluorescent material, green light emitting fluorescent material, and blue light emitting fluorescent material, or by mixing four wavelength lights from four fluorescent materials. However, if the quenching property of light intensity is different depending on fluorescent material to be used, and if there is change of light intensity, a chromaticity will be changed with passage of lighting time, so that density unevenness of image information scanned in the scanning direction, that is, color unevenness occurs.

Moreover, since the temperature characteristics of the fluorescent materials for colors differ from each other, when the light intensity thereof changes due to the circumference environmental temperature surrounding the fluorescent materials, color unevenness occurs and the quality of image deteriorates, similarly.

Therefore, it is necessary to take the light intensity change into consideration, in order not to have influence on an image and design a scanning control system of a copying machine, scanner etc.

The change of light intensity is defined as a change rate of light intensity at time after initiation of lighting to light intensity at the time of initiation of lighting (for example, after 0.1 second from the initiation of lighting) wherein the light intensity at the time of initiation of lighting is a reference value, and light intensity stability is defined as the following formula (1):

$$\text{Light intensity stability}=[1-\phi(T=t600)/\phi(T=t0)]\times 100 \quad (\%) \qquad (1)$$

Here, $\phi(T=t0)$ represents light intensity at time $t=t0$ (for example, 0.1 second after the initiation of lighting) and $\phi(T=t600)$ represents light intensity, after 600 seconds from initiation of lighting. In addition, although T may be suitably selected from 3, 5, or 10 minutes etc., the result in the experiments shown below, was obtained in case of $T=t600$.

It is preferred that the change of light intensity is small, and in case that the change is 10% or more (which is light intensity stability at $T=t600$ in this case, since the change of light intensity usually becomes large with passage of time in case of a rare gas lamp, and the same applies to examples described below), the quality of an image is remarkably deteriorated.

Since an output of the conventional lamp is comparatively small, there are cases where change of light intensity after initiation of lighting does not become a problem, but while in recent years, an output a lamp becomes large, the deterioration of the quality of image due to the change of light intensity after the initiation of lighting has become problematic.

Moreover, although in an image processing, such a change of light intensity is compensated by measuring the light intensity every time a document is scanned, if such compensation is carried out in a scanner or a copying machine, manufacture cost thereof becomes high.

FIG. 20 shows the result of an experiment in which a rare gas fluorescent lamp was turned on by a conventional rare gas fluorescent lamp lighting apparatus, and change of light intensity after initiation of lighting and change of light intensity at different ambient temperatures or circumference environmental temperatures surrounding the lamp was observed.

In the figure, a horizontal axis shows time (seconds), and a vertical axis shows illuminance stability. As the illuminance stability of the vertical axis, relative illuminance at each temperature after initiation of lighting is shown, wherein the illuminance is regarded as 100 at each circumference environmental temperature at time immediately after initiation of lighting (for example, 0.1 second thereafter). The light intensity of the rare gas fluorescence lamp has little dependence on circumference environmental temperature as described above. Although, for example, after 600 seconds passes from initiation of lighting, the light intensity does not have much difference depending on each circumference environmental temperature, the light intensity immediately after the initiation of lighting differs at each circumference environmental temperature.

In addition, a result of an experiment is described below, wherein white light emitted from combined fluorescent materials which have similar temperature quenching properties is used.

As shown in the figure, light intensity stability at 25° C. (degrees Celsius), 60° C., and −10° C. was −10%, −15% and 5%, respectively, wherein the illuminance from time immediately after initiation of lighting to time when lighting is stabilized, changed sharply. Moreover, the light intensity stability difference at −10° C. and 60° C. in each circumference environmental temperature change was approximately 20%.

In an image reading apparatus having such a light source, since change of light intensity is large, in case of a white-and-black (monochrome) image, unevenness image occurs, and in case of color image, color unevenness occurs. Moreover, the quality of the scanned image changes depending on the circumference environmental temperature.

As mentioned above, when such a rare gas fluorescent lamp is used as a light source of a document scanning apparatus, image unevenness or color unevenness occurs, if change of light intensity is large from immediately after initiation of lighting. In recent years, since an output of a lamp becomes large, the change of light intensity has been problematic, especially. Moreover, since the change of light intensity was dependent also on circumference environmental temperature, the quality of an image changes depending on the circumference environmental temperature.

In view of the above problems, it is an object of the present invention to reduce change of light intensity at an early stage of lighting in a lamp.

Another object of the present invention is to reduce influence to change of light intensity due to circumference environmental temperature.

A further object of the present invention is to provide a rare gas fluorescent lamp apparatus in which deterioration of image quality at time of scanning is prevented.

A rare gas fluorescent lamp apparatus according to the present invention has an outer enclosure in which electric discharge is generated, a rare gas fluorescent lamp using excimer light generated by the electric discharge, in which at least one of electrodes is disposed on an outer surface of the outer enclosure, and a fluorescent material layer is formed on an inner side of the outer enclosure, and a power supply unit which supplies high frequency wave voltage between the electrodes of the rare gas fluorescent lamp, wherein the power supply unit has an inverter unit and a control unit.

Further, in view of the present invention, the control unit is configured as set fort below in order to solve the above problems.

(1) The control unit has a detecting unit which detects lamp voltage or lamp current and converts the lamp voltage or the lamp current into a predetermined voltage signal, a reference voltage source unit, an error amplifier which compares the voltage signal detected by the detecting unit with a reference voltage of the reference voltage source unit so as to carry out negative feedback control to the inverter unit, and a time constant control unit provided in the reference voltage source unit or the detecting unit.

Change of light intensity is reduced by matching time variation at start up of temperature of the lamp tube wall and the start-up property of the inverter circuit etc. with time constant of the time constant circuit and changing the voltage of the reference voltage supply or the detected signal of the detection circuit with passage of time from initiation of the rare gas fluorescent lamp of the power supply apparatus, thereby reducing change of light intensity.

(2) The control unit has a detecting unit which detects lamp voltage or lamp current and converts the lamp voltage or the lamp current into a predetermined voltage signal, a reference voltage source unit, an error amplifier which compares the voltage signal outputted from the detecting unit with a reference voltage of the reference voltage source unit so as to carry out negative feedback control to the inverter unit, a time constant control unit, and a thermo-sensitive element.

The reference voltage of the reference voltage source unit or the voltage signal detected by the detecting unit is changed with passage of time from initiation of a lamp lighting operation by the time constant control unit, and the reference voltage of the reference voltage source unit or the signal detected by the detecting unit is changed with passage of time according to the temperature detected by the thermo-sensitive element, thereby reducing light intensity change due to circumferential environmental temperature.

(3) The control unit has a detecting unit which detects input voltage of the inverter unit, a reference voltage source unit, an error amplifier which compares a signal outputted from the detecting unit with a reference voltage of the reference voltage source unit so as to control the input voltage of the inverter unit in a negative feedback manner, and a time constant control unit provided in the reference voltage source unit or the detecting unit.

In addition, change of light intensity is reduced by matching time variation at start up of temperature of the lamp tube wall and the start-up property of the inverter circuit etc. with time constant of the time constant circuit and changing the voltage of the reference voltage source or the detected signal of the detection circuit with passage of time from initiation of the rare gas fluorescent lamp by the time constant circuit, thereby reducing the change of light intensity.

(4) The control unit has a detecting unit which detects input voltage of the inverter unit, a reference voltage source unit, an error amplifier which compares a signal outputted from the detecting unit with a reference voltage of the reference voltage source unit so as to control the input voltage of the inverter unit in a negative feedback manner, a time constant control unit, and a thermo-sensitive element for detecting temperature around the apparatus, wherein the time constant control unit and the thermo-sensitive element are provided in the reference voltage source unit or the detecting unit.

The reference voltage of the reference voltage source unit or the signal detected by the detecting unit is changed with passage of time from initiation of a lamp lighting operation by the time constant control unit, and the reference voltage of the reference voltage source unit or the signal detected by the detecting unit is changed with passage of time according to the temperature detected by the thermo-sensitive element.

The following effects can be acquired in a present invention.

That is, it is possible to prevent density unevenness of an image or color unevenness, and further it is possible to prevent the quality of an image from changing due to circumference environmental temperature.

(1) By providing a time constant circuit, the voltage of the reference voltage source unit or the detection signal of the detection circuit is changed with passage of time from initiation of light of a rare gas fluorescent lamp of the power supply apparatus, and power to be supplied to the lamp which is in a state of low temperature is controlled immediately after the lighting, whereby it is possible to control initial light intensity, so that it is possible to improve the light intensity stability, so that the light intensity stability at normal temperature (or room temperature) can be reduced to approximately 10% or less.

(2) By providing a time constant control unit and a thermo-sensitive element which detects temperature around the apparatus, the reference voltage of the reference voltage source unit or the signal detected by the detecting unit is changed with passage of time from initiation of a lamp lighting operation by the time constant control unit, and the reference voltage of the reference voltage source unit or the signal detected by the detecting unit is changed with passage of time according to the temperature detected by the thermo-sensitive element, so that it is possible to not only improve light intensity stability, but also reduce temperature dependency of light intensity change by controlling initial light intensity from immediately after initiation of lighting, whereby it is possible to reduce the light intensity attenuation rate to 10% or less at −10 to 60° C. of circumference environmental temperature.

Thus, the present invention possesses a number of advantages or purposes, and there is no requirement that every claim directed to that invention be limited to encompass all of the advantages and objects.

In addition, the foregoing has outlined rather broadly the features and technical advantages of the present invention in order that the detailed description of the invention that follows may be better understood. Additional features and advantages of the invention will be described hereinafter which form the subject of the claims of the invention.

DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Description of the present invention be given, referring to Embodiments. While the present invention is not necessarily limited to such embodiments, an appreciation of various aspects of the invention is best gained through a discussion of various examples in such an application.

Figure 1:
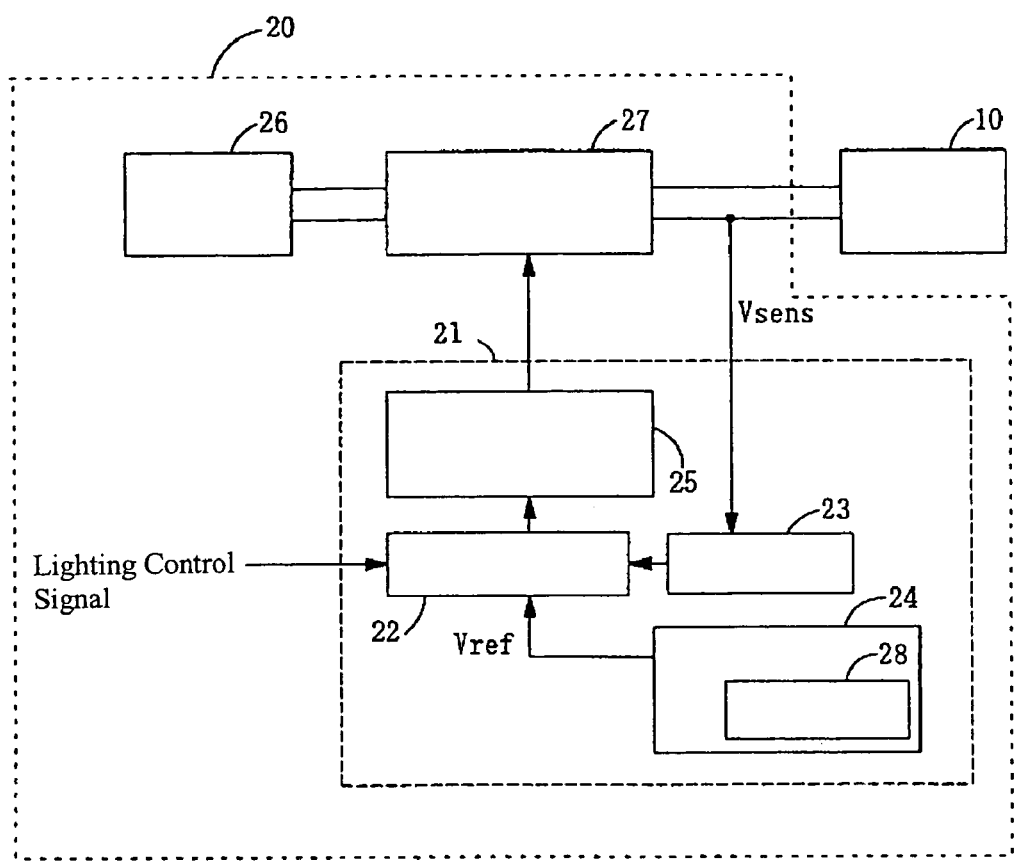
FIG. 1 shows a block diagram of a lamp lighting apparatus according to a first embodiment of the present invention.

FIG. 1 shows a block diagram of a lamp lighting apparatus according to a first embodiment of the present invention.

Figure 18A:
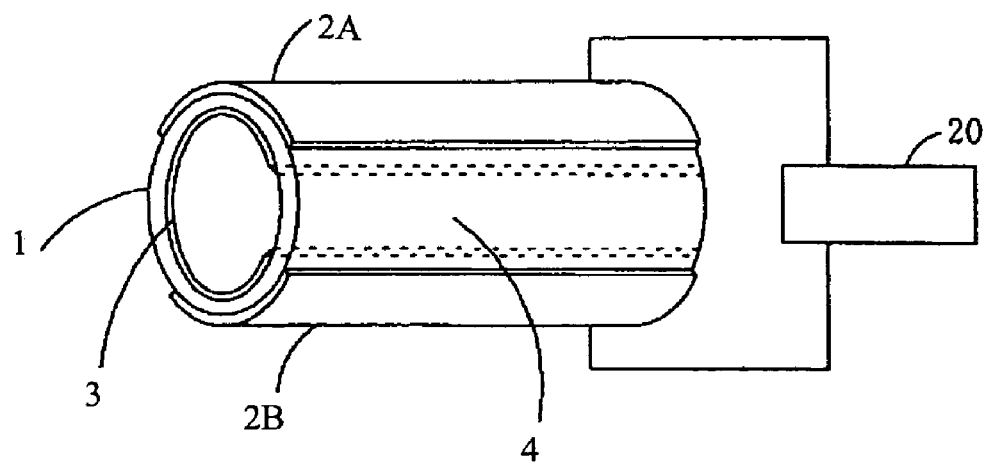
FIG. 18A is a schematic diagram showing the structure of the rare-gas fluorescence lamp.
Figure 18B:
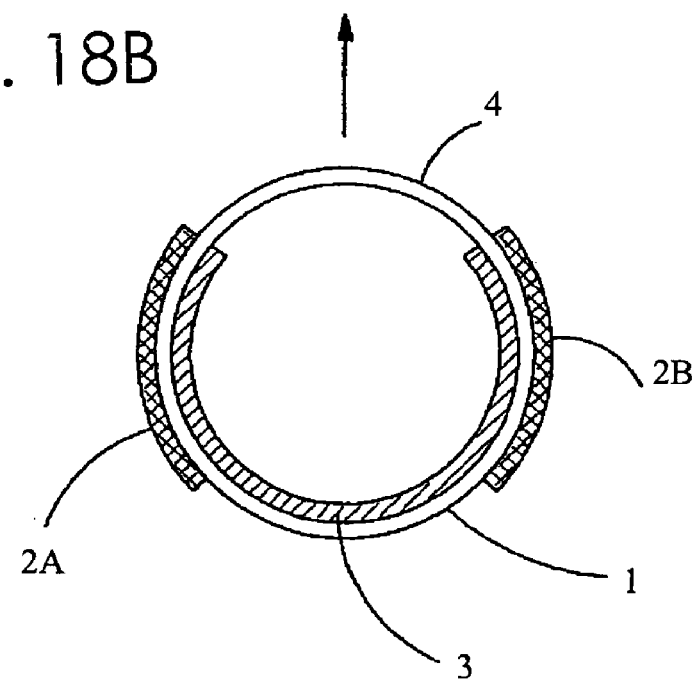
FIG. 18B shows a cross-sectional view in a direction perpendicular to the arc tube axial direction of the rare-gas fluorescence lamp.
Figure 19:
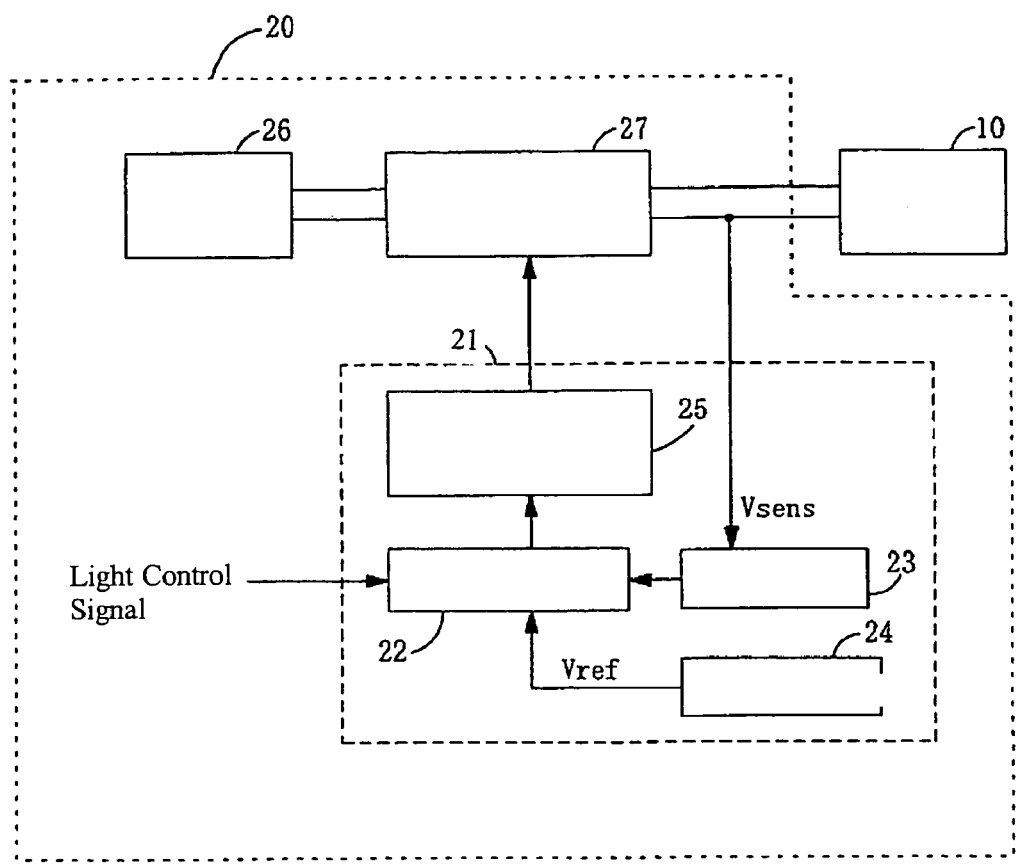
FIG. 19 shows a block diagram of a conventional rare-gas fluorescence lamp lighting apparatus.

A rare gas fluorescence lamp 10 is connected to an output terminal of an inverter circuit 27 to which electric power is supplied from a power supply 26, and a control unit 21 is connected to the inverter circuit 27. As the rare gas fluorescence lamp 10, for example, a lamp shown in FIG. 18 or a lamp in which a pair of electrodes is arranged along a direction of a tube axis of an outer enclosure so that the electrodes face each other on an inner surface and an outside surface of the outer enclosure respectively, is used.

The control unit 21 is equipped with a detecting unit 23, a reference voltage source 24 including a time constant circuit 28, an error amplifier 22, and an inverter circuit drive units 25 having an oscillator etc., for generating a drive signal of the inverter circuit 27. The detecting unit 23 is a circuit, which detects the electric power supplied to the lamp 10 based on an electrical signal, such as voltage or current. The reference voltage source 24, which generates reference voltage, has the time constant circuit 28, and an output terminal of the time constant circuit 28 is connected to the error amplifier 22.

In FIG. 1, although the reference voltage source unit 24 outputs voltage when the control unit 21 receives a lighting control signal, the voltage inputted into the error amplifier 22 from the time constant circuit 28 increases gradually with passage of time so as to reach the reference voltage.

The error amplifier 22 compares the voltage outputted from the time constant circuit 28, which gradually increases with an output of the detecting unit 23 so as to output an error signal thereof to the inverter circuit drive unit 25. The inverter circuit 27 is driven by the inverter circuit drive unit 25, and controls the electric power to be supplied to the lamp 10 in a pulse width modulation method or a frequency modulation method according to the output of the error amplifier 22.

For this reason, the electric power supplied to the lamp 10 immediately after the lighting control signal is inputted is controlled more than the electric power in a stable state. Therefore, the light intensity at time immediately after initiation of lighting becomes small, by setting up the time constant of the time constant circuit 28 according to the temperature quenching property of the fluorescent material, so that it is possible to realize a lighting apparatus with little time fluctuation of light intensity.

In addition, although as described above, in this embodiment, the electric power is detected based on the electric signal, such as voltage or current which is supplied to the lamp 10, a signal corresponding to the voltage or current can be used to detect the electric power supplied to the lamp 10. Although the signal corresponding to the voltage or current which is supplied to the lamp 10 may be, voltage or current impressed to a switching element, as described later, voltage, power or current in the input side of an inverter circuit may be used to detect the electric power, and the way of detecting the electric power is not to limited to these examples.

Figure 2:
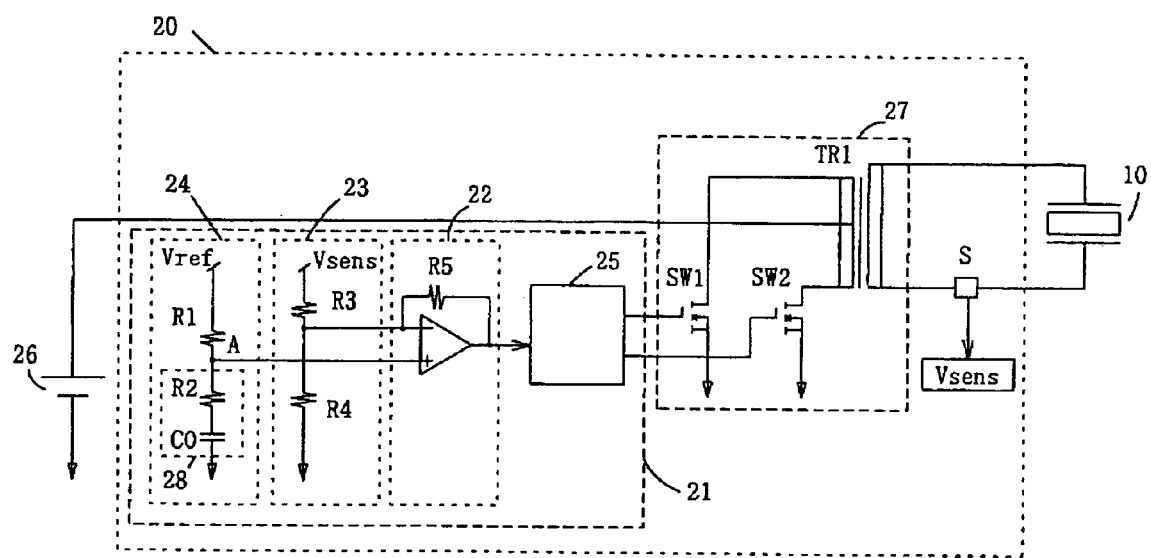
FIG. 2 shows a configuration example (a pull-push type) of circuit of the lamp lighting apparatus shown in FIG. 1.

FIG. 2 shows a circuit configuration example of the lamp lighting apparatus shown in FIG. 1. FIG. 2 shows a push-pull type circuit as an example of the inverter circuit.

The reference voltage source 24 comprises a series circuit which makes up with a capacitor C0, and a voltage dividing circuit in which resistors R1 and R1 are in series connected to each other, wherein a time constant circuit is formed by the resistors R1 and R2 and the capacitor C0.

When the reference voltage Vref is impressed to the reference voltage source unit 24 after the control unit 21 receives the lighting control signal, a potential of a connection point A of the resistors R1 and R2 becomes a potential which is calculated by Vref×[R2/(R1+R2)], and after that, as the capacitor C0 is charged, the potential at the connection point A rises with passage of time according to the time constant represented by T=C0×(R1+R2) so as to finally reach the reference voltage Vref. The voltage generated in the connection point A is supplied to one of input terminals of the error amplifier 22. In addition, C0 represents the capacity of the capacitor C0, and R1 and R2 are the resistance of resistors R1 and R2.

Moreover, the detecting unit 23 comprises a series circuit having resistors R3 and R4, wherein the signal which corresponds to the voltage or current and is used to detect the electric power supplied to the lamp 10, is divided by the resistors R3 and R4, and supplied to the other input terminal of the error amplifier 22.

The error amplifier 22 comprises an operational amplifier having, for example, a negative feedback resistor R5, and outputs voltage corresponding to an output voltage error of the reference voltage source unit 24 and the detecting unit 23.

An output of the error amplifier 22 is given to the inverter circuit drive unit 25. The inverter circuit drive unit 25 controls a drive frequency of the inverter circuit 27 according to the error signal. For example, if the lamp electric power detected by the detecting unit 23 becomes smaller than the value set up by the reference voltage source 24, the drive frequency of the inverter circuit 27 is made higher so as to increase the electric power to be supplied to the lamp 10, and if the electric power supplied to the lamp 10 becomes larger than the value set up by the reference voltage source 24, the drive frequency is made lower so that lamp electric power becomes small.

The inverter circuit 27 is equipped with switching elements SW1 and SW2 and a center-tap transformer TR1, wherein the switching elements SW1 and SW2 are controlled so as to be turned on by turns by the output of the inverter circuit drive unit 25 so that alternating voltage is generated in the secondary side of the transformer TR1. The voltage generated in the secondary side of the transformer is supplied to the lamp 10 so as to turn on the lamp 10. Moreover, a sensor S, which detects the current or voltage supplied to the lamp 10, is provided in the secondary side of the transformer TR1, and the output of the sensor S is applied to the detecting unit 23.

In FIG. 2, when the control unit receives the lighting control signal, as described above, the reference voltage which the reference voltage source 24 outputs rises with passage of time according to the time constant of the above-mentioned time constant circuit 28. According to this rise, the voltage inputted into one of the terminals of the error amplifier 22 rises, and the electric power supplied to the lamp 10 also goes up. And when the capacitor C0 of the time constant circuit 28 is charged to the reference voltage Vref, the voltage inputted into one of the terminals of the error amplifier 22 turns into the reference voltage Vref, and the electric power of the lamp is controlled to become a steady value.

Figure 20:
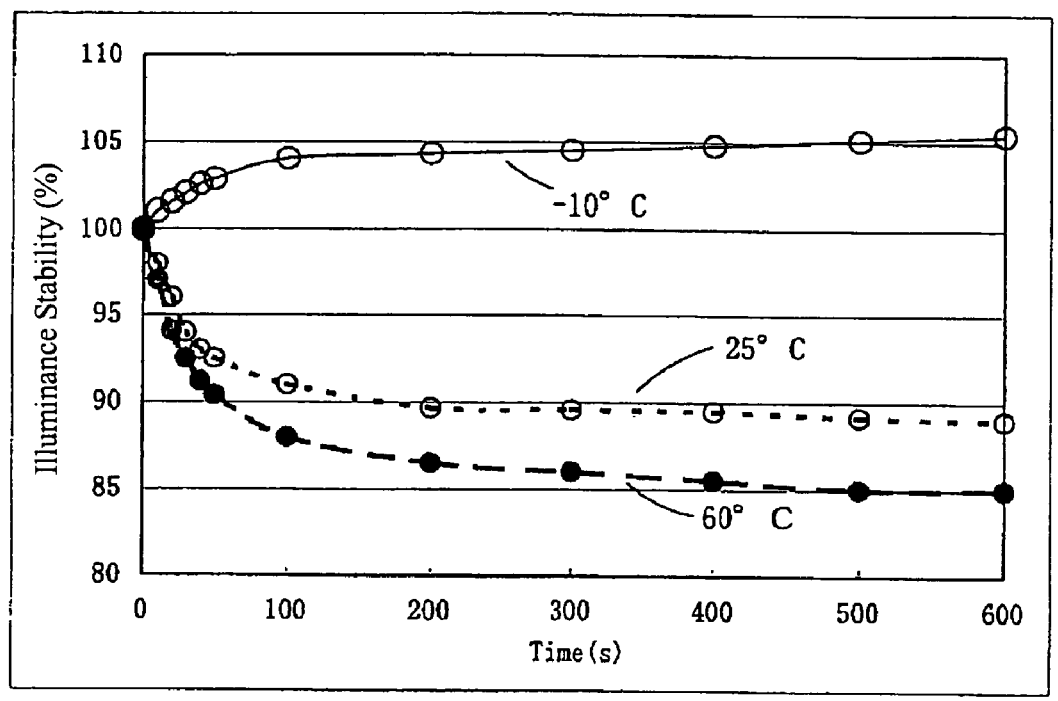
FIG. 20 shows the result of an experiment in which in case that a rare gas fluorescent lamp was turned on by a conventional rare gas fluorescent lamp lighting apparatus, change of light intensity after initiation of lighting and change of light intensity at different circumference environmental temperatures was measured.

The time constant of the time constant circuit 28 is set so that change of light intensity becomes small, according to the change of light intensity at the time of lighting. For example, the time constant may be set to a suitable value such as 200 or less seconds, in case that light intensity of the lamp is mostly stabilized 200 seconds after initiation of lighting, as shown in FIG. 20.

Figure 3:
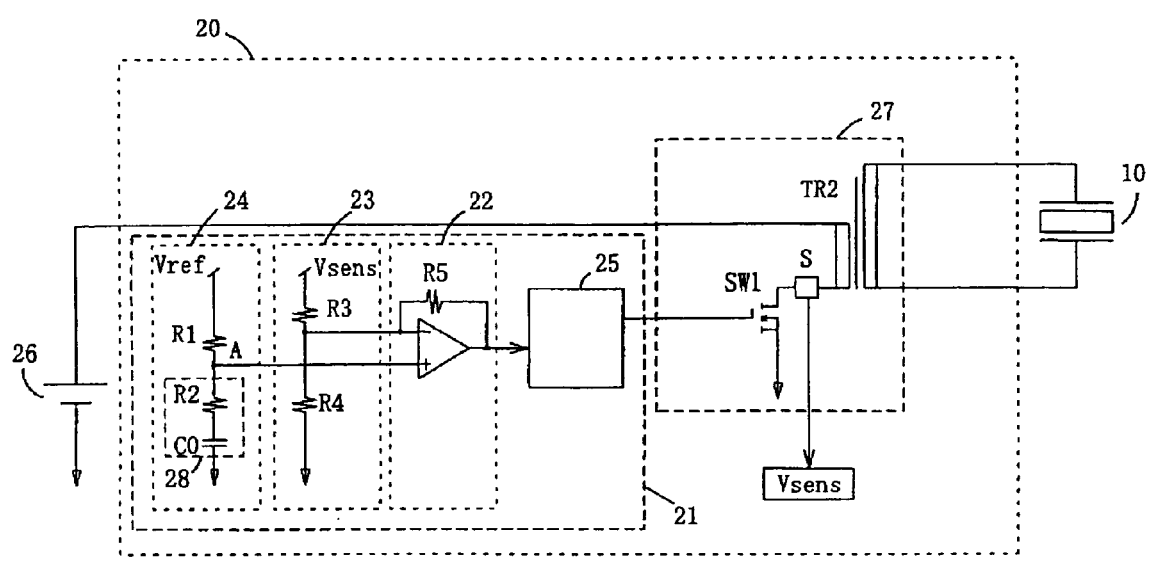
FIG. 3 shows another circuit configuration example of the lamp lighting apparatus shown in FIG. 1, wherein a flyback type circuit is used as an inverter circuit.

FIG. 3 shows another circuit configuration example of the lamp lighting apparatus shown in FIG. 1, wherein a flyback type circuit is used as an inverter circuit.

The circuit configuration shown in FIG. 3 is the same as that shown in FIG. 2, except that the flyback type inverter circuit is used.

The inverter circuit 27 is equipped with a switching element SW1 and a transformer TR2. The output of the error amplifier 22 is applied to the inverter circuit drive unit 25, and the inverter circuit drive unit 25 controls drive frequency or ON time of the switching element SW1 of the inverter circuit 27 according to the output of the error amplifier 22, so that pulse-like alternating voltage is generated in the secondary side of the transformer TR2. The voltage generated in the secondary side of the transformer TR2 is supplied to the lamp 10, so as to turn on the lamp 10. Moreover, in this example, a sensor S, which detects the current or voltage supplied to the lamp 10, is provided in the primary side of the transformer TR2, and an output of the sensor S is applied to the detecting unit 23.

Other operations of the circuit are the same as those of the circuit shown in FIG. 2, and when a lighting control signal is given, as described above, the reference voltage which the reference voltage source unit 24 outputs rises with passage of time according to the time constant of the time constant circuit 28. According to the rise, the voltage inputted into one of terminals of the error amplifier 22 rises, and the electric power supplied to the lamp 10 also rises. And when the capacitor C0 of the time constant circuit 28 is charged to the reference voltage Vref, the voltage inputted into one of the terminals of the error amplifier 22 turns into the reference voltage Vref, and the electric power of the lamp 10 is controlled so as to become a steady value.

Although in FIGS. 2 and 3, the time constant circuit 28 is provided in the reference voltage source unit 24, the same operation can be realized even when the time constant circuit 28 is provided in the detecting unit 23.

Figure 4:
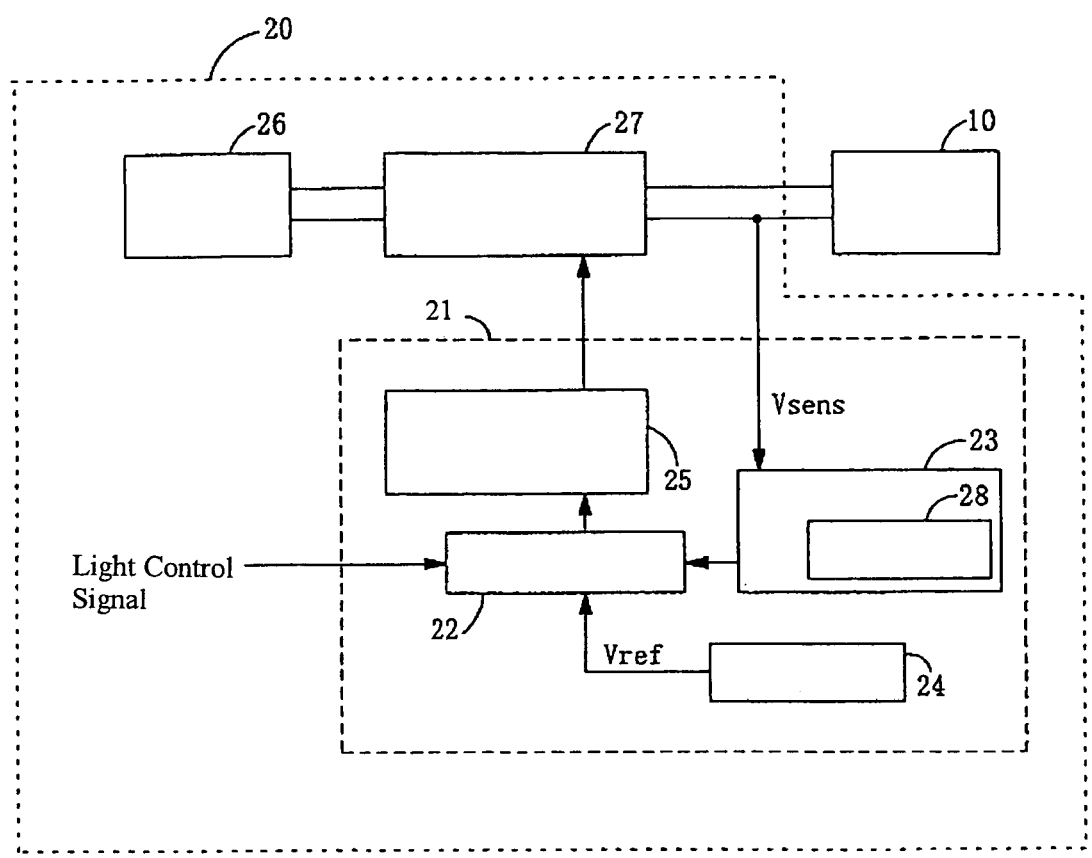
FIG. 4 is a block diagram showing a modification of the first embodiment.

FIG. 4 is a block diagram showing a modification of the first embodiment.

In this embodiment, the circuit configuration of the error amplifier 22, the inverter circuit drive unit 25, and the inverter circuit 27 is the same as that of the above-mentioned embodiments, except that the time constant circuit 28 is provided in the detecting unit 23 as mentioned above.

In case where the time constant circuit 28 is provided in the detecting unit 23, the time constant circuit 28 is set so that the output of the detecting unit 23 is large at the time of initiation of lighting, and the output of the detecting unit 23 becomes small with passage of time. Thereby, the circuit can be operated as that of the embodiment shown in FIG. 1.

Figure 5:
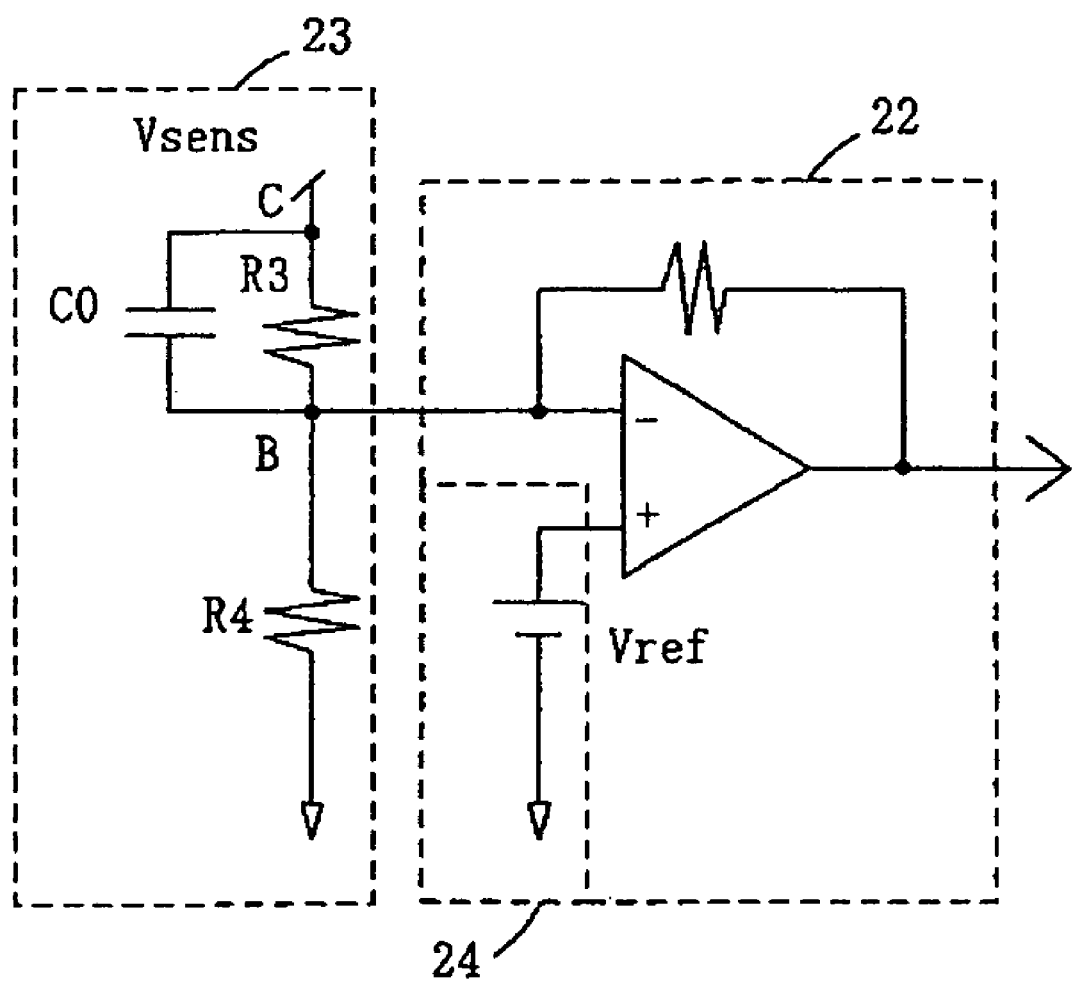
FIG. 5 shows a circuit configuration example of the detecting unit 23, the reference voltage source unit 24, and the error amplifier 22

FIG. 5 shows a circuit configuration example of the detecting unit 23, the reference voltage source unit 24, and the error amplifier 22. In addition, the other portion of the circuit according to the embodiment is the same as those shown in FIGS. 3 and 4.

The reference voltage source unit 24 generates the reference voltage Vref, and the reference voltage is supplied to one of input terminals of the error amplifier 22.

Moreover, the detecting unit 23 comprises a circuit in which a capacitor C0 is in parallel connected to a resistor R3 between a connection point B of resistors R3 and R4 which are in series connected, and a detecting signal input terminal C, wherein the capacitor C0 and the resistor R4 forms a time constant circuit.

Since charging voltage of the capacitor C0 is zero (0) at beginning of a lighting operation, the potential of the connection point B of the resistors R3 and R4 becomes Vsens when the detecting signal Vsens is applied to the detecting signal input terminal C, and then the potential falls with passage of time according to the time constant which is represented by $T=C0 \times R4$ so that the potential of the connection point C eventually reaches a potential calculated by $Vsens \times [(R4/(R3+R4))]$.

The voltage generated at the connection point B of the detecting unit 23 is supplied to the other input terminal of the error amplifier 22. The error amplifier 22 obtains an error between the reference voltage Vref generated at the connection point A and the voltage generated at the connection point B of the detecting unit 23 and outputs it to the inverter circuit drive unit 25 as described above.

The lamp lighting apparatus shown in FIGS. 4 and 5 operates as described below.

When the control unit 21 is operated by a lighting control signal, the reference voltage source unit 24 outputs the reference voltage Vref, whereby the error amplifier 22 generates an output, according to which the inverter circuit drive unit 25 drives the inverter circuit 27, and the lamp 10 is turned on by the electric power supplied from the inverter circuit 27. Moreover, a signal, which corresponds to electric power supplied to the lamp 10, is detected by the detecting unit 23.

Since the time constant circuit 28 is provided in the detecting unit 23, the signal which corresponds to the electric power supplied to the lamp 10 is not directly inputted into the error amplifier 22, so that the voltage which is inputted into the error amplifier 22 by the time constant circuit 28, gradually falls with passage of time, as described above.

The error amplifier 22 compares the voltage which falls with passage of time by the above-mentioned time constant circuit 28 with the reference voltage which the reference voltage source unit 22 outputs, and outputs an error signal to the inverter circuit drive unit 25. The inverter circuit 27 is driven by the inverter circuit drive unit 25, and controls the electric power supplied to the lamp 10 in a pulse width modulation method, a frequency modulation method or the like according to the output of the error amplifier 22.

As mentioned above, in this embodiment, the output of the detecting unit 23 is large at the time of initiation of lighting, and since the output falls with passage of time after the lighting starts, the electric power of the lamp at time immediately after the lighting control signal is inputted is suppressed much more than the electric power at the time of stable state as in the above-mentioned embodiments. Therefore, if the time constant of the time constant circuit 28 is set according to the temperature quenching property of the fluorescent material, it is possible to realize a lighting apparatus in which light intensity at time immediately after initiation of lighting becomes small and time fluctuation of light intensity is little.

Figure 6:
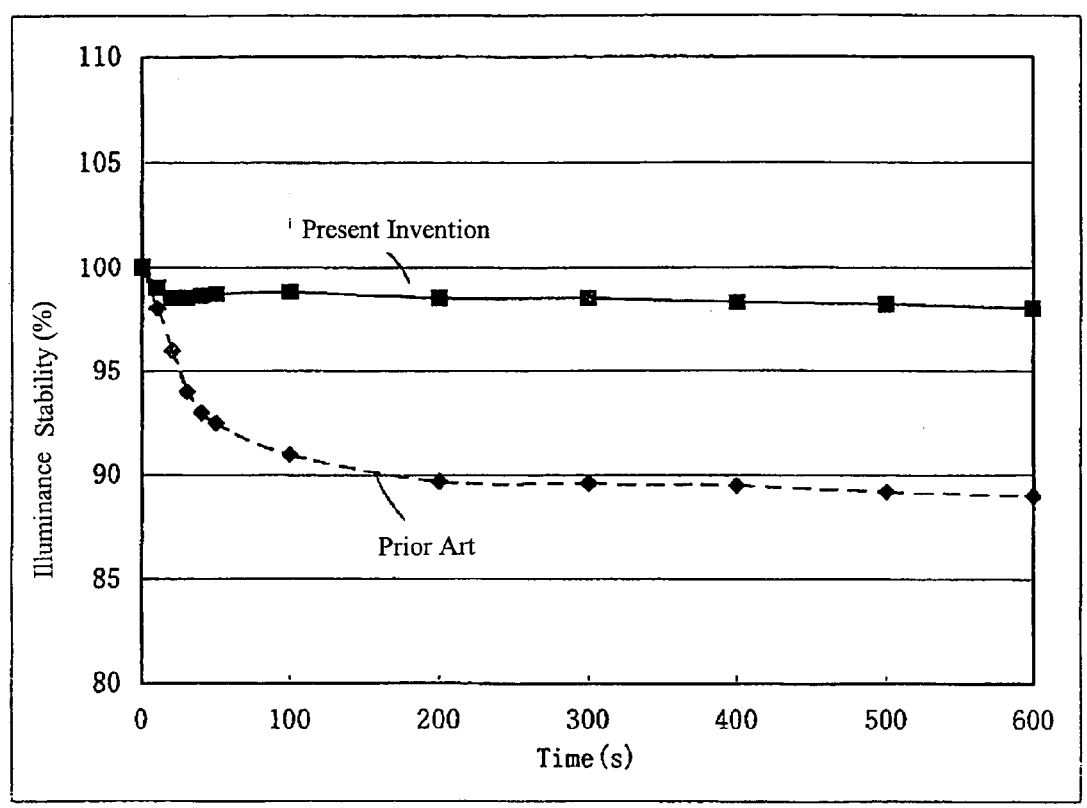
FIG. 6 shows a result of an experiment in which light intensity stability is measured at room temperature in the conventional rare gas fluorescent lamp apparatus, which does not have a time constant circuit, and the rare gas fluorescent lamp apparatus according to the first embodiment.

FIG. 6 shows a result of an experiment in which light intensity stability was measured at room temperature (normal temperature) by using the conventional rare gas fluorescent lamp apparatus, which does not have a time constant circuit, and the rare gas fluorescent lamp apparatus according to the embodiment of the present invention shown in FIG. 1. In the figure, a vertical axis represents time (seconds), and a horizontal axis represents the relative illuminance, wherein light intensity immediately after initiation of lighting is set to 100, as described above.

The "light intensity stability" is a value defined by the above-mentioned formula (1), and in this experiment, the light intensity stability was measured in case of T=600. Moreover, in the measurement of the light intensity stability, change of light intensity with passage of time was measured at 8 mm of distance in a direction of a normal line from an aperture 4 (refer to FIG. 18) of the light source (lamp) by an illuminometer.

As shown in the figure, while the light intensity stability of the conventional rare gas fluorescent lamp apparatus was 11%, that of the rare gas fluorescent lamp apparatus is 2%. Thus, it turns out that in the rare gas fluorescent lamp apparatus according the embodiment of the present invention, the light intensity stability was improved as compared with the conventional rare gas fluorescent lamp.

It is required that light intensity change of a light source used for an image scanning apparatus be 105% or less and 90% or more in order to reduce density unevenness at the time of exposure. In the result shown in FIG. 6, the light intensity stability at normal temperature falls within the ranges of 105% or less and 90% or more, so that generation of image density unevenness or color unevenness can be controlled. For this reason, it is not necessary to provide means for compensating difference of light intensity by measuring the light intensity.

Figure 7:
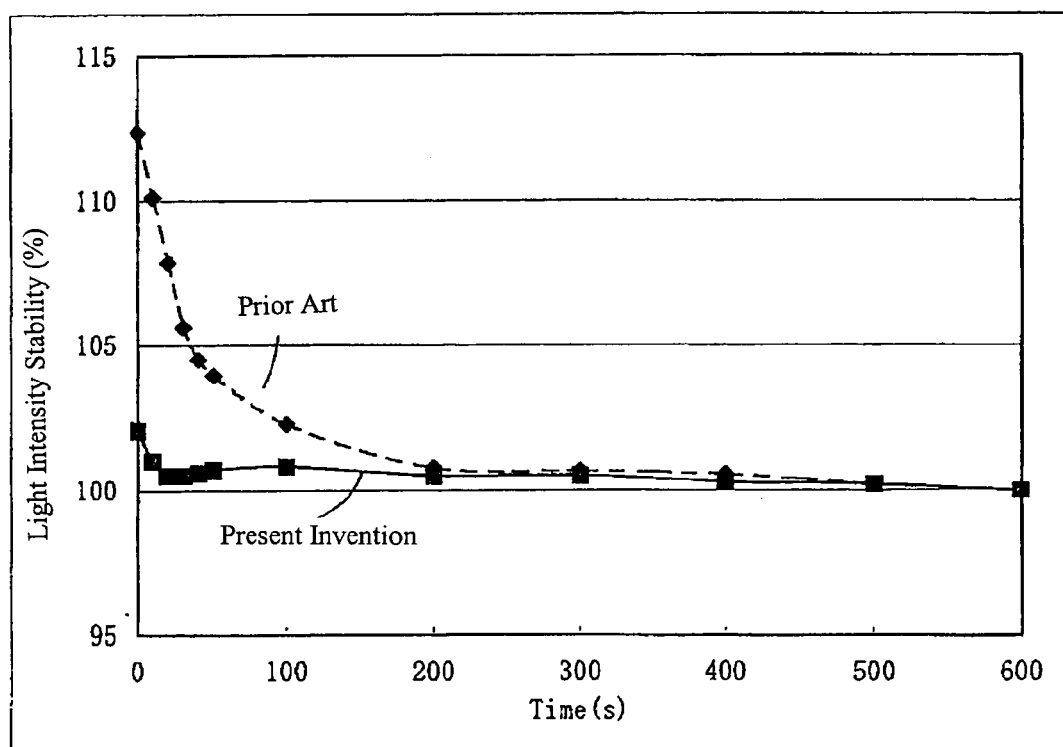
FIG. 7 shows a result of experiment about light intensity stability of the conventional rare gas fluorescent lamp apparatus which does not have a time constant circuit, and the rare gas fluorescent lamp apparatus according to the embodiment of the present invention shown in FIG. 1, wherein the light intensity is regarded as 100, at time after 600 seconds from initiation of lighting.

FIG. 7 shows change of the light intensity of the conventional rare gas fluorescent lamp apparatus which does not have a time constant circuit, and the rare gas fluorescent lamp apparatus according to the embodiment of the present invention shown in FIG. 1, wherein the light intensity is regarded as 100, after 600 seconds from the initiation of lighting.

In addition, since it is assumed that the light intensity of the lamp according to the present invention and that of the conventional lamp is approximately the same after 600 seconds from the initiation of lighting, this figure shows relative scale of the light intensity of the lamp immediately after initiation of lighting according to the embodiment, and that of the conventional rare gas fluorescent lamp apparatus.

As shown in the figure, while in the conventional lamp, the relative light intensity at time immediately after initiation of lighting is 112% of the light intensity at time after 600 seconds passes from the initiation of a lighting operation, the relative light intensity immediately after initiation of lighting is 102% thereof since increase of light intensity immediately after initiation of lighting is controlled by the time constant circuit in the rare gas fluorescent lamp according to the invention so that change of light intensity can be reduced as compared with the conventional lamp.

Figure 8:
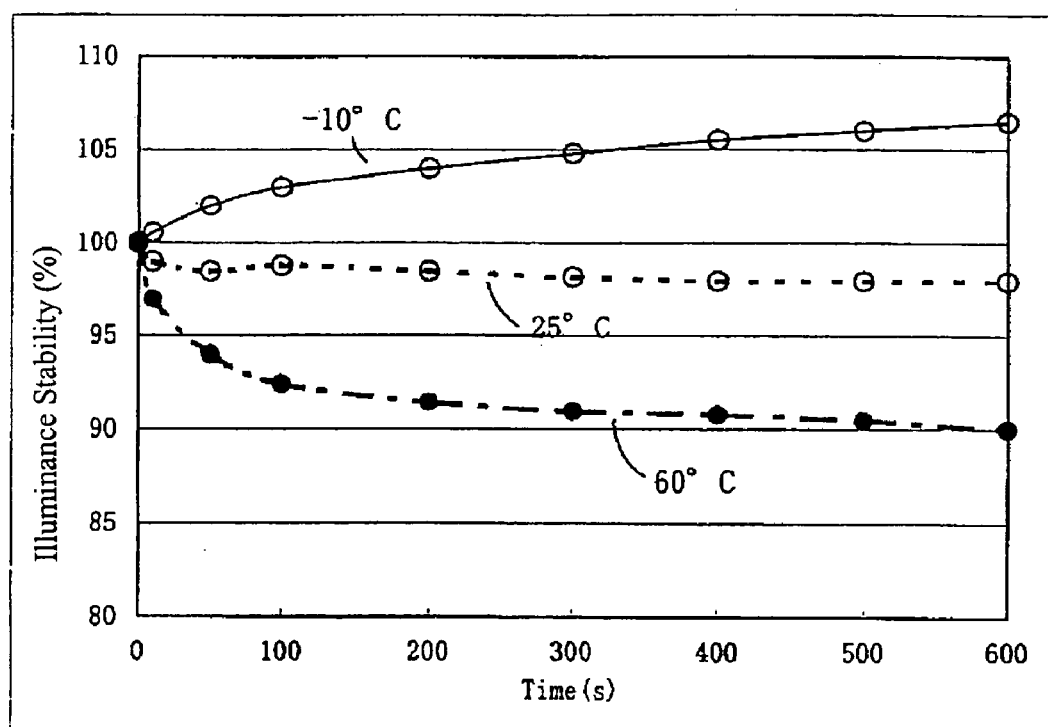
FIG. 8 shows a result of an experiment in which light intensity stability was examined when circumference environmental temperature of the rare gas fluorescent lamp apparatus according to the first embodiment of the present invention shown in FIG. 1 was changed.

FIG. 8 shows a result of an experiment in which light intensity stability was examined when circumference environmental temperature of the rare gas fluorescent lamp apparatus according to the first embodiment of the present invention shown in FIG. 1 was changed. As in FIG. 6, a vertical axis shows time (seconds), and a horizontal axis shows the relative illuminance, wherein as described above, light intensity at time immediately after initiation of a lighting operation, is regarded as 100.

As shown in the figure, difference between light intensity stability of −10° C. and that at 60° C. (circumference environmental temperatures) is 16%, and thus, it turns out that the light intensity stability is improved, as compared with that of the conventional rare gas fluorescent lamp apparatus (approximately 20% between −10° C. and 60° C.).

In addition, in the image reading apparatus, as described above, the light intensity at time immediately after initiation of a lighting operation (for example, 0.1 second after the initiation) is measured, and this value is set to 100. And the initial light intensity is set as a reference value, and the intensity of the received light is divided into predetermined gradation, for example, 256 gradation etc. In such an apparatus, when the initial light intensity exceeds 100, that is, the light intensity of received light exceeds the set point, the light receiving element which is an optical voltage conversion element such as a CCD is saturated. When an image is scanned by such a light source, "whitening" which means deterioration of gradation of an image occurs (for example, values of RGB are 255,255,255, respectively so that the image is reproduced in white), and an image reading function is impaired.

In addition, since in the actual design, the initial value is set with some room in addition to the value, even if the light intensity of received light exceeds the initial value, which is 100, "whitening" does not occur instantly. However, it is not desirable that it exceeds a permissible value of a light intensity rise, which is, for example, 105% of normal light intensity.

Next, a second embodiment of a present invention will be described below. In this embodiment, a thermo-sensitive device is added to a reference voltage source unit or a detecting unit in addition to a time constant circuit, thereby reducing influence of circumference environmental temperature around the circuit.

Figure 9:
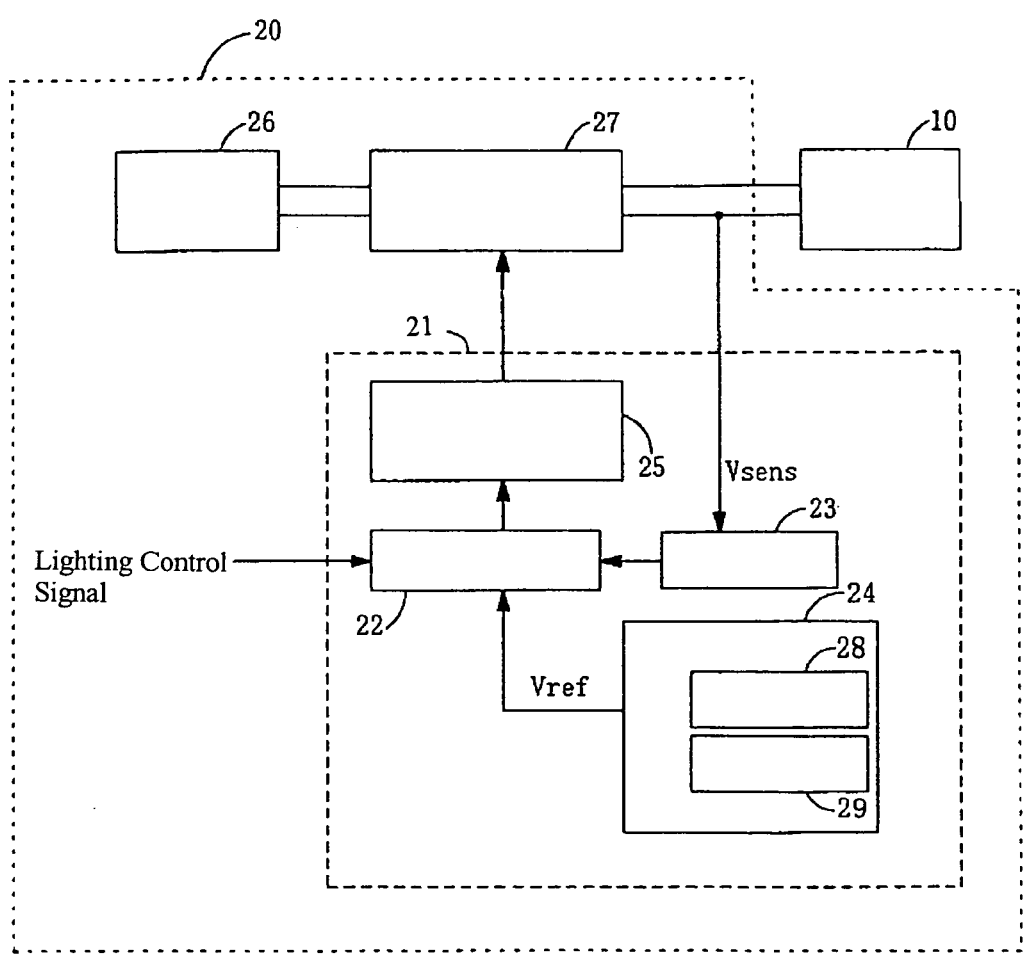
FIG. 9 is a block diagram of the rare gas fluorescent lamp apparatus according to the second embodiment of the present invention

FIG. 9 is a block diagram of the rare gas fluorescent lamp apparatus according to the second embodiment of the present invention.

The second embodiment is different from the first embodiment, in that the thermo-sensitive device 29 is formed in the reference voltage source unit 24 in addition to the time constant circuit 28. Although in this embodiment, an NTC thermistor is used as the thermo-sensitive device, any type of a temperature sensor etc. may be used. A NTC thermistor is an element in which resistance thereof increases at time of low temperature, and the resistance decreases at time of high temperature. In this embodiment, the thermo-sensitive device 29 is formed so that a value of the reference voltage which the reference voltage source unit 24 outputs becomes large and time constant of the time constant circuit becomes large when circumference environmental temperature is low.

The other part of the circuit configuration according to this embodiment is the same as that shown in FIG. 1, wherein when a control unit 21 is operated by a lighting control signal, although the reference voltage source unit 24 outputs voltage, the voltage inputted into the error amplifier 22 by the time constant circuit 28 gradually increases with passage of time so as to reach the above mentioned reference voltage.

In this embodiment, since the thermo-sensitive device 29 is provided in the reference voltage source unit 24, the voltage which the reference voltage source unit 24 outputs becomes large when circumference environmental temperature is low, and the time constant also becomes large.

The error amplifier 22 compares the output of the detecting unit 23 with the voltage, which is gradually increased by the time constant circuit 28, and outputs an error signal to the inverter circuit drive unit 25. The inverter circuit 27 is driven by the inverter circuit drive unit 25, and controls the electric power supplied to the lamp 10 in a pulse width modulation method or a frequency modulation method according to the output of the error amplifier 22.

For this reason, similarly to the first embodiment of the present invention, the lamp electric power at time immediately after the lighting control signal is inputted is controlled more than the electric power at the time of stability.

Moreover, since the reference voltage becomes large when circumference environmental temperature is low, the lamp electric power is controlled so as to increase, so that decrease of the light intensity is compensated when the circumference environmental temperature is low. Moreover, since the lamp electric power is controlled so as to decrease when the circumference environmental temperature is high, it is possible to compensate light intensity increase when the circumference environmental temperature is high. Furthermore, the time constant changes according to the circumference environmental temperature, thereby compensating the change of light intensity at the time of initiation of lighting.

Therefore, it is possible to realize a lighting apparatus with little time fluctuation of the light intensity due to the influence of the circumference environmental temperature by appropriately selecting the time constant of the time constant circuit 28, and the temperature characteristic of the thermo-sensitive device 29.

Figure 10:
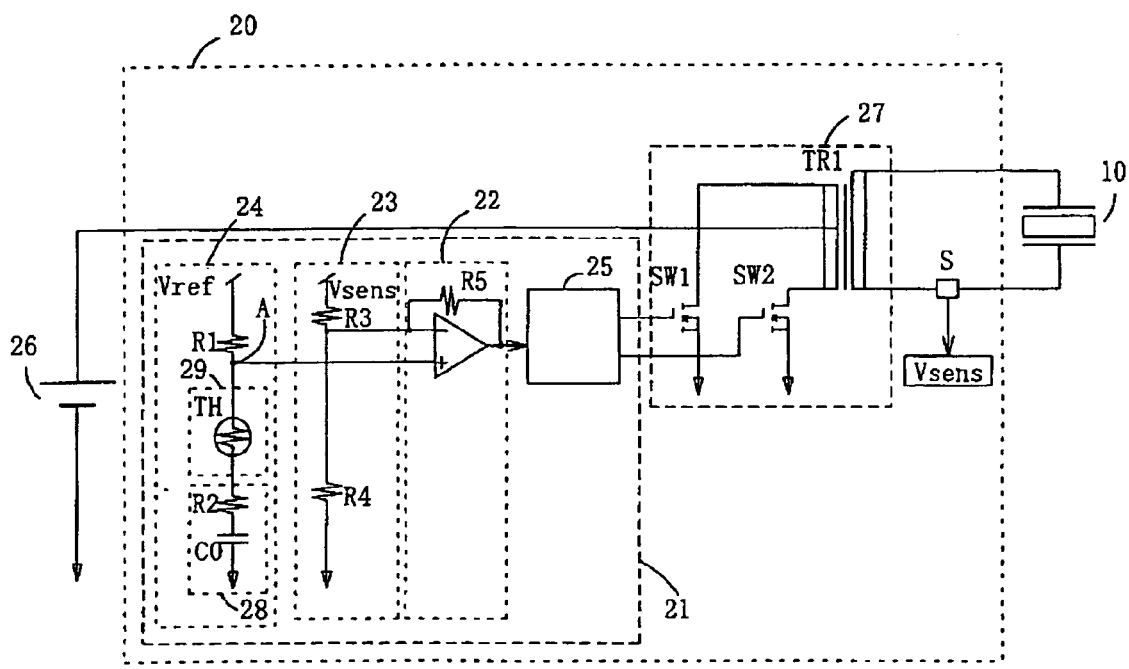
FIG. 10 shows an example of a circuit configuration of the lamp lighting apparatus according to the second embodiment of the present invention, wherein a pull push type circuit is used.

FIG. 10 shows an example of a circuit configuration of the lamp lighting apparatus shown in FIG. 9, wherein a push-pull type circuit is used as an inverter circuit.

The reference voltage source unit 24 comprises a series circuit which is made up with a capacitor C0 and a voltage dividing circuit in which resistors R1 and R2 and a thermo-sensitive device 29 are in series connected, wherein a time constant circuit is formed by the resistors R1 and R2, the thermo-sensitive device 29, and the capacitor C0.

When the lighting control signal is given, and the reference voltage Vref is impressed to the reference voltage source unit 24, a potential of a connection point A of the resistor R1 and the thermo-sensitive device 29 turns into a potential represented by Vref×[(R2+Rt)/(R1+R2+Rt)] wherein Rt is resistance of the thermo-sensitive device 29. Then, as the capacitor C0 is charged, the potential of the connection point A rises with passage of time according to the time constant represented by T=C0×(R1+R2+Rt), so as to eventually reach the reference voltage Vref. The voltage generated at the connection point A is supplied to one of input terminals of an error amplifier 22.

Moreover, a detecting unit 23 comprises a series circuit having resistors R3 and R4, wherein the signal which corresponds to the voltage or current and is used to detect the electric power supplied to the lamp, is divided by the resistors R3 and R4, and supplied to the other input terminal of the error amplifier 22.

The other part of the circuit configuration according to this embodiment is the same as that shown in FIG. 2, wherein when the lighting control signal is inputted, as described above, the reference voltage which reference voltage source 24 outputs rises with passage of time according to the time constant of the time constant circuit 28. According to the rise, the voltage inputted into one of the terminals of the error amplifier 22 rises, and the electric power supplied to the lamp 10 also goes up. And when the capacitor C0 of the time constant circuit 28 is charged to the reference voltage Vref, the voltage inputted into one of the terminals of the error amplifier 22 turns into the reference voltage Vref, and the electric power of the lamp is controlled to become a steady value.

Although in FIG. 10 the push-pull type circuit is shown as the inverter circuit, if a flyback type circuit is used, it is possible to realize a circuit for the present invention by using the circuit configuration shown in FIG. 3.

Moreover, although in FIG. 10, a NTC thermistor is used as the thermo-sensitive element 29 and the thermo-sensitive element 29 is provided in the reference voltage source unit 24, a PTC thermistor may be used as the thermo-sensitive element 29.

Figure 11A:
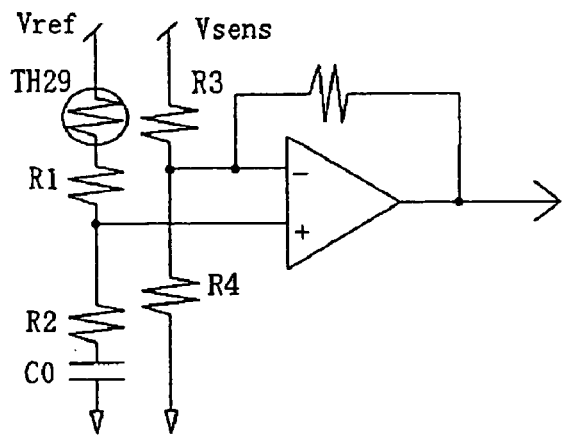
FIG. 11 is a modified example of a portion comprising a detecting portion, a reference voltage source portion, and an error amplifier.

Since the PTC thermistor is an element in which resistance decreases at time of low temperature, and the resistance increases at time of high temperature, that is, the temperature/resistance property of the PTC thermistor is contrary to the NTC thermistor, the thermo-sensitive device 29 (PTC thermistor) is formed in the reference voltage Vref side with respect to the connection point A as shown in FIG. 11A. In this embodiment, an operation similar to that of the circuit shown in FIG. 10 can be realized by the configuration of the reference voltage source unit 24, the detecting unit 23, and the error amplifier 22, shown in FIG. 11A.

Moreover, although in the above example, the thermo-sensitive element 29 is provided in the reference voltage source unit 24, the thermo-sensitive element 29 may be provided in the detecting unit 23.

Figure 12:
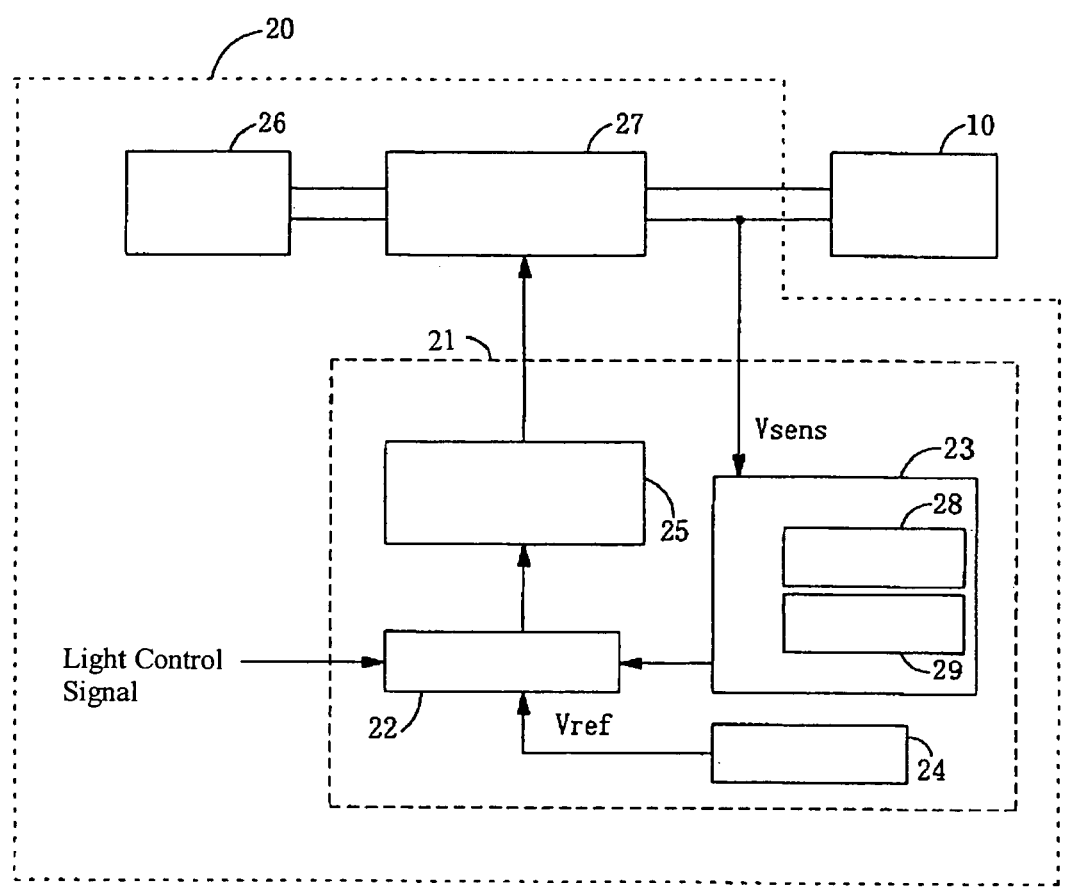
FIG. 12 is a block diagram showing a modification of the second embodiment, wherein the time constant circuit and the thermo-sensitive element are provided in the detecting unit 23.

FIG. 12 is a block diagram showing a modified example of the second embodiment, wherein the error amplifier 22, the inverter circuit drive unit 25 and the inverter circuit 27 etc. are the same as those of the second embodiment, but the time constant circuit 28 and the thermo-sensitive element 29 are provided in the detecting unit 23, as described above.

Although the voltage is set so as to rise gradually in the case that the time constant circuit and the thermo-sensitive element are connected to the reference voltage source unit 24, it is possible to realize a similar operation by setting the voltage so as to decrease gradually in the case that they are provided in the detecting unit 23.

Figure 11B:
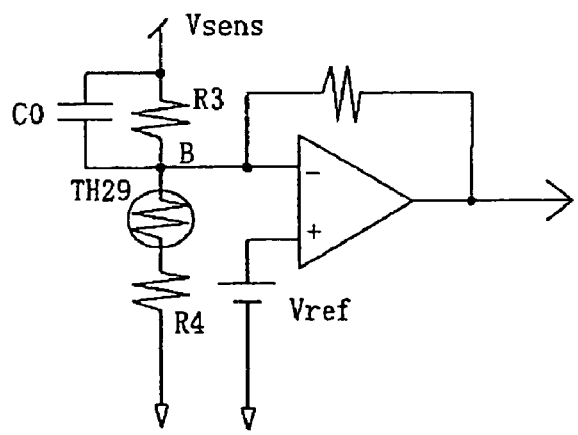

For example, when a PTC thermistor is used as the thermo-sensitive element 29 wherein the thermo-sensitive element 29 is provided in the detecting unit 23, the capacitor C0 is provided in the side of the detecting voltage Vsens with respect to the connection point B and the thermo-sensitive element 29 is provided in the side of the ground, as shown in FIG. 11B.

Moreover, when a NTC thermistor is used as the thermo-sensitive element 29 wherein the thermo-sensitive element 29 is provided in the detecting unit 23, the capacitor C0 is provided in the side of the detecting voltage Vsens with respect to the connection point B and the thermo-sensitive element 29 is in series connected to the capacitor C0, as shown in FIG. 1C.

Figure 11C:
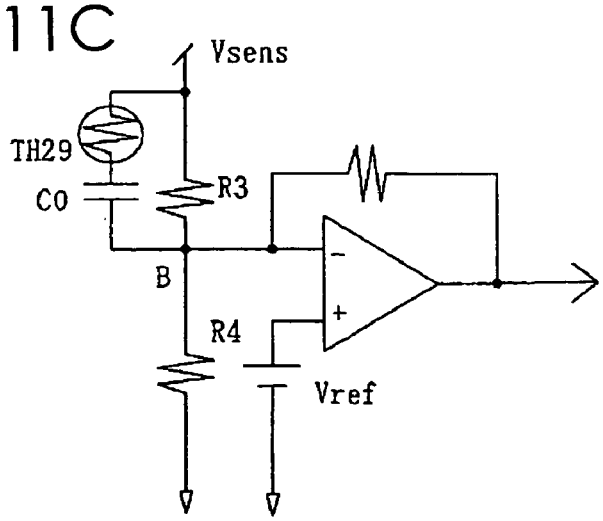

An operation similar to that of the circuit shown in FIG. 10 can be realized by using the circuit configuration of the reference voltage source unit 24, the detecting unit 23, and the error amplifier 22 shown in FIGS. 11B and 11C.

Figure 13:
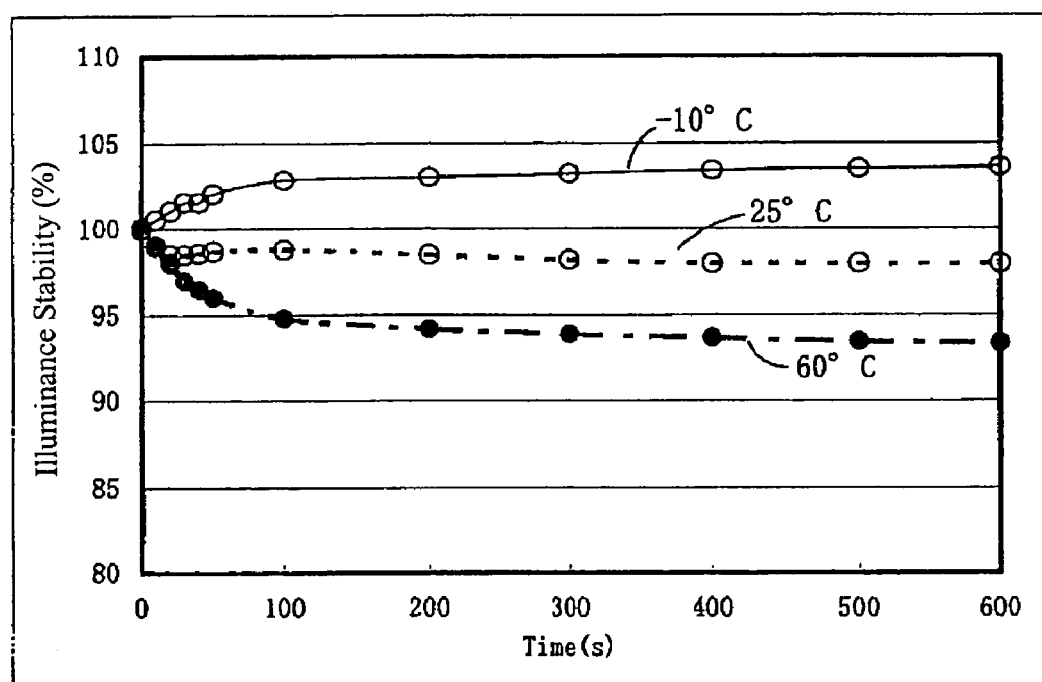
FIG. 13 shows a result of an experiment in which in the rare gas fluorescent lamp apparatus according to the second embodiment of the present invention, light intensity stability was measured, changing circumference environmental temperature.

FIG. 13 shows a result of an experiment in which in the rare gas fluorescent lamp apparatus according to the second embodiment of the present invention shown in FIG. 9, light intensity stability was measured, changing circumference environmental temperature. In the figure, a horizontal axis represents time (seconds), and a vertical axis represents the relative illuminance wherein light intensity at time immediately after initiation of lighting is set to 100, as in FIG. 6.

In the circuit configuration according to the present embodiment, a difference of the light intensity stability between −10° C. and 60° C. of circumference environmental temperatures is improved to approximately 10%. In an image reading apparatus having such a light source, since unevenness image does not occur, it is not necessary to provide a means for compensating a light intensity difference by measuring the light intensity.

That is, while in the first embodiment of the present invention, it is possible to improve the light intensity stability under condition where circumference environmental temperature does not change largely, it is preferable to use the circuit according to the second embodiment of the present invention under condition where the circumference environmental temperature changes largely.

Although in the first and second embodiments, lamp electric power is detected and the inverter circuit is controlled based on a difference between the lamp electric power and the reference voltage, in this embodiment, it is possible to similarly compensate change of the light intensity by controlling the input voltage of the inverter circuit.

Hereafter, the third embodiment according to the present invention will be explained. In the third embodiment, the light intensity stability is improved by controlling the input voltage of the inverter circuit.

Figure 14:
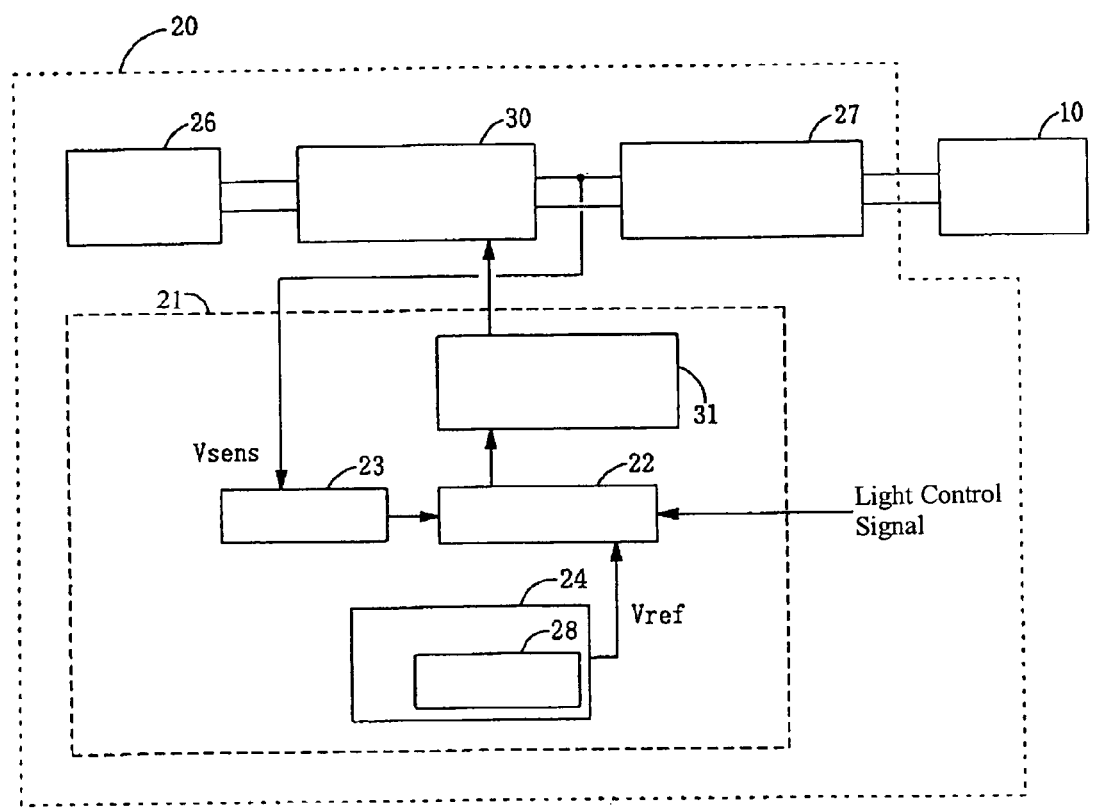
FIG. 14 shows a block diagram of a rare gas fluorescent lamp apparatus according to the third embodiment of the present invention.

FIG. 14 shows a block diagram of a lamp lighting apparatus according to the third embodiment of the present invention.

A switching circuit 30 is connected to a power supply 26, and the switching circuit 30 supplies electric power to the lamp 10 through the inverter circuit 27. A control unit 21 is connected to the inverter circuit 27. The switching circuit 30 comprises, for example, a booster chopper circuit, and raises voltage from the power supply 26.

The control unit 21 comprises a detecting unit 23, a reference voltage source unit 24 including a time constant circuit 28, an error amplifier 22 and a switching circuit drive unit 31 which generates a drive signal of the switching circuit 30. The detecting unit 23 is a circuit, which detects the voltage supplied to the inverter circuit 27, and the reference voltage source unit 24 has the time constant circuit 28.

In FIG. 14, when the control unit 21 is operated by a lighting control signal, the reference voltage source unit 24 outputs voltage, but the voltage inputted into the error amplifier 22 from the time constant circuit 28 increases gradually with passage of time, so as to reach the reference voltage.

The error amplifier 22 compares the voltage which is gradually increased by the time constant circuit 28 with voltage supplied to the inverter circuit 27 which is detected by the detecting unit 23, and outputs an error signal to the switching circuit drive unit 31. The switching circuit 30 is driven based on switching frequency according to the output of the error amplifier 22 by the switching circuit drive unit 31, and controls the voltage supplied to the inverter circuit 27. Therefore, the inverter supply voltage at time immediately after a lighting control signal is inputted is suppressed more than the voltage at the time of stability. Accordingly, the light intensity becomes small at time immediately after initiation of lighting, by setting up the time constant of the time constant circuit 28 according to the temperature quenching property of the fluorescent material, so that it is possible to realize a lighting apparatus with little time fluctuation of light intensity.

Figure 15:
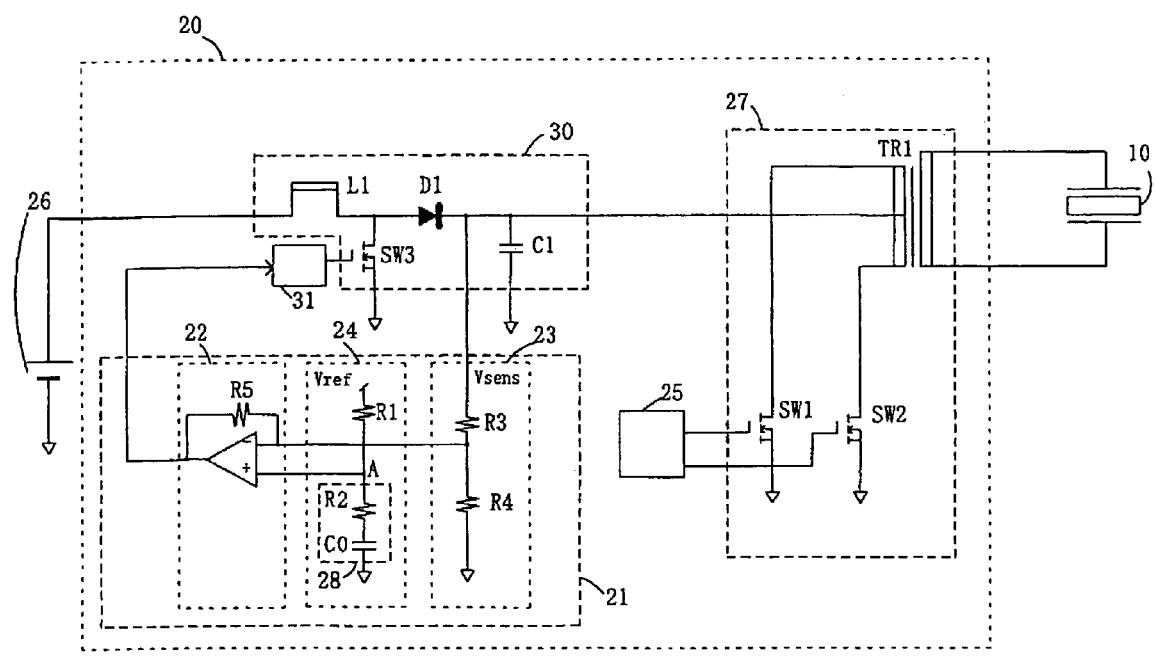
FIG. 15 shows an example of a circuit configuration of a lamp lighting apparatus, wherein a push-pull type circuit is used.

FIG. 15 shows an example of a circuit configuration of a lamp lighting apparatus shown in FIG. 14, wherein a push-pull type circuit is used as an inverter circuit.

The switching circuit 30 is a booster circuit comprising a reactor L1, a switching element SW3, and a diode D1, etc., wherein voltage charged in a capacitor C1 which is connected to the output side of the diode D1 is supplied to the inverter circuit 27. The switching element SW3 is switched on at frequency according to the output of the error amplifier 22 by the switching circuit drive unit 31.

The structure of the reference voltage source unit 24 is the same as that shown in FIGS. 2 and 3, comprising the capacitor C0 and a voltage dividing circuit in which resistors R1 and R1 are in series connected, wherein when the lighting control signal is inputted, a potential of the connection point A of the resistors R1 and R2 rises according to time constant represented by $C0 \times (R1+R2)$ so as to eventually reach the reference voltage Vref.

Moreover, the output voltage of the switching circuit 30 is detected by the detecting unit 23. The detecting unit 23 comprises a series circuit of resistors R3 and R4, wherein the output voltage of the switching circuit 30 is divided by the resistors R3 and R4, so as to be applied to the other input terminal of the error amplifier 22.

The output of the error amplifier 22 is applied to the switching circuit drive unit 31, and the switching circuit drive unit 31 controls the switching frequency of the switching element SW3 according to the error. For example, when the voltage detected by the detecting unit 23 becomes smaller than that set by the reference voltage source unit 24, the switching frequency is controlled to become higher so as to increase the voltage supplied to the inverter circuit 27, and when the voltage detected by the detecting unit 23 becomes larger than that set by the reference voltage source unit 24, the switching frequency is controlled to become lower so as to decrease the voltage supplied to the inverter 27.

The switching elements SW1 and SW2 of the inverter circuit 27 are controlled so as to be turned on by turns by the output of the inverter circuit drive unit 25, so that alternating voltage is generated in the secondary side of the transformer TR1. The voltage generated in the secondary side of the transformer TR1 is supplied to the lamp 10 so as to turn on the lamp 10.

In FIG. 15, when a lighting control signal is given, as described above, the reference voltage which the reference voltage source unit 24 outputs rises with passage of time according to the time constant of the time constant circuit 28. The voltage inputted into one of the terminals of the error amplifier 22 rises according to the rise of the reference voltage, and the voltage supplied to the inverter circuit 27 also rises. When the capacitor C0 of the time constant circuit 28 is charged to the reference voltage Vref, the voltage inputted into one of the terminals of the error amplifier 22 turns into the reference voltage Vref, and the voltage supplied to the inverter circuit 27 is controlled so as to become a steady value.

The time constant of the time constant circuit 28 is set so that change of light intensity becomes small, according to the change of light intensity at time of lighting, as described above.

Although in FIG. 15, the push-pull type circuit is used as the inverter circuit, when a flyback type circuit is used as the inverter circuit, the circuit structure shown in FIG. 3 is used to similarly realize the lighting apparatus.

Moreover, although in the embodiment described above, the time constant circuit 28 is provided in the reference voltage source unit 24, as shown in FIG. 4, even if the time constant circuit 28 is provided in the detecting unit 23, the same operation can be realized.

Next, a fourth embodiment of the present invention is explained.

A thermo-sensitive element is provided in the reference voltage source unit or the detecting unit in addition to the time constant circuit according to the third embodiment, thereby reducing influence of the circumference environmental temperature.

Figure 16:
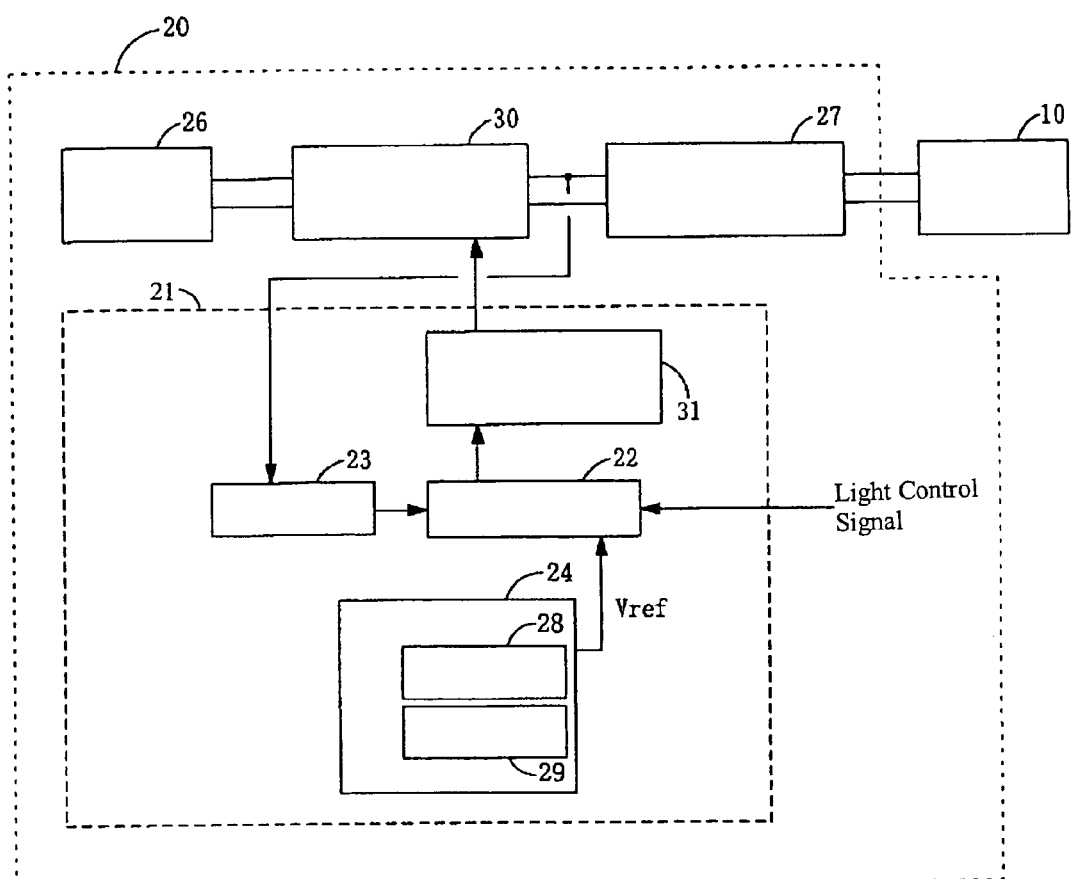
FIG. 16 is a block diagram of a rare gas fluorescent lamp apparatus according to a fourth embodiment of the present invention.
Figure 17:
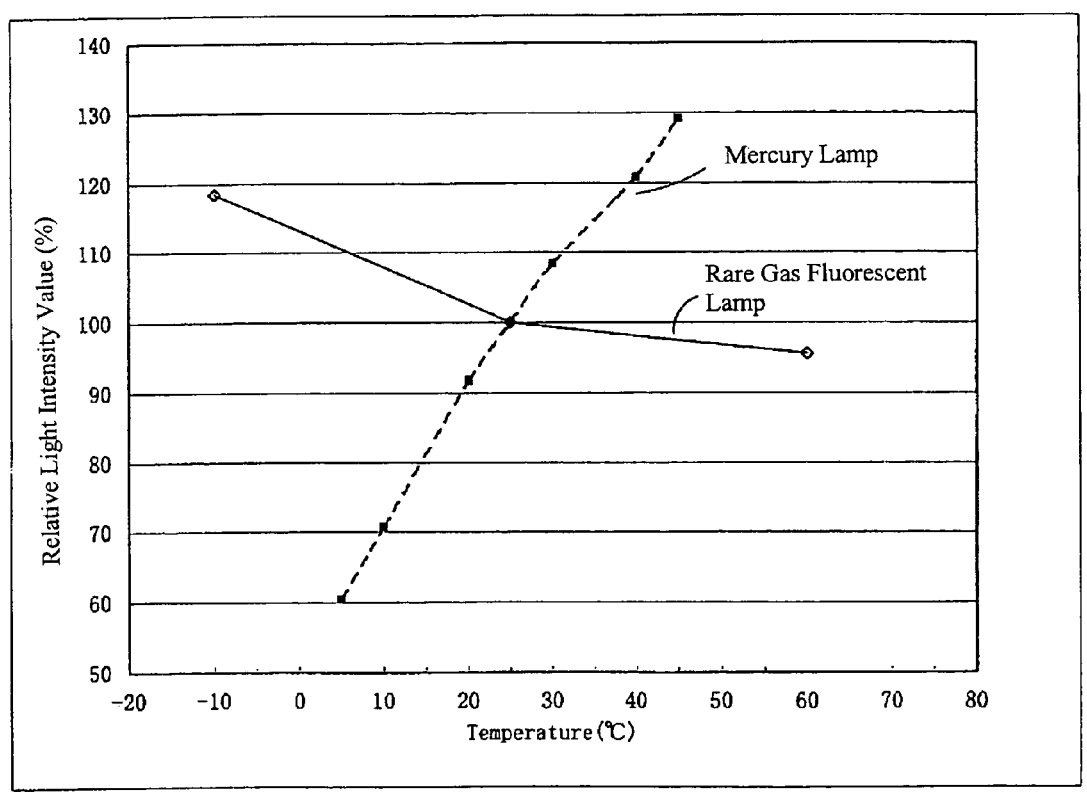
FIG. 17 is a graph showing change of light intensity to change of circumference environmental temperature of a rare-gas fluorescence lamp and a mercury lamp.

FIG. 16 is a block diagram of the rare gas fluorescent lamp apparatus according to the fourth embodiment of the present invention.

The fourth embodiment is different from the third embodiment in that the thermo-sensitive element 29 is provided in addition to the time constant circuit 28 in the reference voltage source unit 24.

The other part of the circuit configuration according to this embodiment is the same as that shown in FIG. 14, wherein when the control unit 21 is operated by a lighting control signal, although the reference voltage source unit 24 outputs voltage, the voltage inputted into the error amplifier 22 by the time constant circuit 28 gradually increases with passage of time so as to reach the above-mentioned reference voltage.

In this embodiment, since the thermo-sensitive device 29 is provided in the reference voltage source unit 24, the voltage which the reference voltage source unit 24 outputs becomes large when circumference environmental temperature is low, and the time constant also becomes large.

The circuit configuration according to this embodiment is the same as that shown in FIG. 15, except that the thermo-sensitive element is provided in the reference voltage source unit 24, and also, can be applied to a rare gas fluorescent lamp apparatus having a flyback type inverter circuit as described above.

Although in the above embodiment, the thermo-sensitive element is provided in the reference voltage source unit, the thermo-sensitive element may be provided in the detecting unit as shown in FIG. 11. Further, either a NTC or PTC thermistor may be used as the thermo-sensitive element, so that a place where the thermo-sensitive element is provided can be suitably selected as shown in FIG. 11.

In addition, although in the third and fourth embodiments, the switching circuit 30 comprising the booster chopper circuit is used as a circuit for supplying electric power to the inverter circuit 27. A step-down chopper circuit, step-down/booster copper circuit, or other circuits may be used in place of the booster chopper circuit, and even if a different type of electric power supply circuit is used, the effects of the present invention can be achieved.

In addition, although in the first to fourth embodiments, the time constant circuit formed by a CR circuit etc. is used, a different pattern generating circuit, such as a pattern generating circuit etc. using an operational amplifier may be used. Further, the time change patter may be set so that change of light intensity is smallest according to the light intensity change property of the lamp.

As described above, white light is necessary to scan a color document, and the white light can be obtained by suitably mixing three wavelength lights from three fluorescent materials, that is, red light emitting fluorescent material, green light emitting fluorescent material, and blue light emitting fluorescent material, or by mixing four wavelength lights from four fluorescent materials.

However, if the quenching property of light intensity is different, depending on fluorescent material to be used, and if there is change of light intensity, a chromaticity will be changed with lighting time so that density unevenness of image information scanned in the scanning direction, that is, color unevenness occurs.

In Japanese Laid Open Patent No. 2003-109544, color unevenness measures are proposed. In the present invention disclosed in the patent, a fluorescent layer is formed by combining fluorescent materials wherein the fluorescent materials have similar quenching properties.

In the present invention, it is possible to effectively prevent color unevenness when scanning a color document by using the lamp having a fluorescent material disclosed in Japanese Laid Open Patent No. 2003-109544.

Thus the present invention possesses a number of advantages or purposes, and there is no requirement that every claim directed to that invention be limited to encompass all of the advantages and purposes.

The disclosure of Japanese Patent Application No. 2004-276922 filed on Sep. 29, 2004 including specification, drawings and claims is incorporated herein by reference in its entirety.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A rare gas fluorescent lamp apparatus, comprising:
an outer enclosure in which electric discharge is generated;
a rare gas fluorescent lamp using excimer light generated by the electric discharge, in which at least one of electrodes is disposed on an outer surface of the outer enclosure, and a fluorescent material layer is formed on an inner side of the outer enclosure; and
a power supply unit, which supplies high frequency wave voltage between the electrodes of the rare gas fluorescent lamp,
wherein the power supply unit has an inverter unit and a control unit,
the control unit has a detecting unit which detects lamp voltage or lamp current and converts the lamp voltage or the lamp current into a predetermined voltage signal, a reference voltage source unit, and an error amplifier which compares the voltage signal detected by the detecting unit with a reference voltage of the reference voltage source unit so as to carry out negative feedback control to the inverter unit, and
a time constant control unit is provided in the reference voltage source unit or the detecting unit, in which the reference voltage of the reference voltage source unit or the voltage signal detected by the detecting unit is controlled with passage of time from initiation of a lamp lighting operation by the time constant control unit.

2. A rare gas fluorescent lamp apparatus, comprising:
an outer enclosure in which electric discharge is generated;
a rare gas fluorescent lamp using excimer light generated by the electric discharge, in which at least one of electrodes is disposed on an outer surface of the outer enclosure, and a fluorescent material layer is formed on an inner side of the outer enclosure; and
a power supply unit, which supplies high frequency wave voltage between the electrodes of the rare gas fluorescent lamp,
wherein the power supply unit has an inverter unit and a control unit,
the control unit has a detecting unit which detects lamp voltage or lamp current and converts the lamp voltage or the lamp current into a predetermined voltage signal, a reference voltage source unit, and an error amplifier which compares the voltage signal detected by the detecting unit with a reference voltage of the reference voltage source unit so as to carry out negative feedback control to the inverter unit, and a time constant control unit and a thermo-sensitive element which detects temperature around the apparatus are provided in the reference voltage source unit or the detecting unit, in which the reference voltage of the reference voltage source unit or the voltage signal detected by the detecting unit is changed with passage of time from initiation of a lamp lighting operation by the time constant control unit, and the reference voltage of the reference voltage source unit or the signal detected by the detecting unit is changed with passage of time according to the temperature detected by the thermo-sensitive element.

3. A rare gas fluorescent lamp apparatus, comprising:

an outer enclosure in which electric discharge is generated;

a rare gas fluorescent lamp using excimer light generated by the electric discharge, in which at least one of electrodes is disposed on an outer surface of the outer enclosure, and a fluorescent material layer is formed on an inner side of the outer enclosure; and a power supply unit, which supplies high frequency wave voltage between the electrodes of the rare gas fluorescent lamp, wherein the power supply unit has an inverter unit and a control unit, the control unit has a detecting unit which detects input voltage of the inverter unit, a reference voltage source unit, and an error amplifier which compares a signal outputted from the detecting unit with a reference voltage of the reference voltage source unit so as to control the input voltage of the inverter unit in a negative feedback manner, and a time constant control unit is provided in the reference voltage source unit or the detecting unit, in which the reference voltage of the reference voltage source unit or the signal detected by the detecting unit is controlled with passage of time from initiation of a lamp lighting operation by the time constant control unit.

4. A rare gas fluorescent lamp apparatus, comprising:

an outer enclosure in which electric discharge is generated;

a rare gas fluorescent lamp using excimer light generated by the electric discharge, in which at least one of electrodes is disposed on an outer surface of the outer enclosure and a fluorescent material layer is formed on an inner side of the outer enclosure, and a power supply unit, which supplies high frequency wave voltage between the electrodes of the rare gas fluorescent lamp, wherein the power supply unit has an inverter unit and a control unit, the control unit has a detecting unit which detects input voltage of the inverter unit, a reference voltage source unit, and an error amplifier which compares a signal outputted from the detecting unit with a reference voltage of the reference voltage source unit so as to control the input voltage of the inverter unit in a negative feedback manner, and a time constant control unit and a thermo-sensitive element which detects temperature around the apparatus are provided in the reference voltage source unit or the detecting unit, in which the reference voltage of the reference voltage source unit or the signal detected by the detecting unit is changed with passage of time from initiation of a lamp lighting operation by the time constant control unit, and the reference voltage of the reference voltage source unit or the signal detected by the detecting unit is changed with passage of time according to the temperature detected by the thermo-sensitive element.

* * * * *